United States Patent [19]
Leone et al.

[11] Patent Number: 6,032,806
[45] Date of Patent: Mar. 7, 2000

[54] SCREEN APPARATUS FOR VIBRATORY SEPARATOR

[75] Inventors: Vincent D. Leone, Houston; Thomas C. Adams, Hockley, both of Tex.; Jeffrey Walker, Lafayette; David L. Schulte, Jr., Broussard, both of La.; Charles N. Grichar; Kenneth W. Seyffert, both of Houston, Tex.; Guy L. McClung, III, Spring, Tex.

[73] Assignee: Tuboscope I/P, Inc.

[21] Appl. No.: 09/276,267

[22] Filed: Mar. 25, 1999

Related U.S. Application Data

[60] Division of application No. 08/786,515, Jan. 21, 1997, which is a continuation-in-part of application No. 08/504,495, Jul. 20, 1995, Pat. No. 5,598,930, application No. 08/598,566, Feb. 12, 1996, abandoned, and application No. 29/048,575, Jan. 4, 1996, Pat. No. Des. 377,636, which is a continuation of application No. 29/014,571, Oct. 25, 1993, Pat. No. Des. 366,040, which is a continuation-in-part of application No. 07/956,123, Apr. 30, 1993, Pat. No. 5,385,669, and application No. 08/105,696, Aug. 12, 1993, Pat. No. 5,392,925, said application No. 08/598,566, is a continuation-in-part of application No. 08/220,101, Mar. 30, 1994, Pat. No. 5,490,598.

[51] Int. Cl.[7] .................................................. B07B 1/49
[52] U.S. Cl. .......................... 209/402; 209/403; 209/412
[58] Field of Search .................................. 209/311, 315, 209/319, 329, 331, 333, 399, 405, 273, 292, 391, 402, 412

[56] References Cited

U.S. PATENT DOCUMENTS

| H1481 | 9/1995 | Ray ........................................... 428/98 |
| 40,242 | 10/1863 | Capell . |
| 236,416 | 1/1881 | Bourne . |
| 246,144 | 8/1881 | Keeler . |
| 268,491 | 12/1882 | Hubbell . |
| 275,190 | 4/1883 | Gilbert . |

(List continued on next page.)

FOREIGN PATENT DOCUMENTS

| 59-142818 | of 1984 | Japan . | |
| 269877 | 4/1928 | United Kingdom ................... | 8794 27 |
| 519680 | of 1939 | United Kingdom . | |
| 823648 | of 1957 | United Kingdom . | |
| 1412975 | of 1972 | United Kingdom . | |
| 2124099A | of 1983 | United Kingdom . | |

(List continued on next page.)

OTHER PUBLICATIONS

"Derrick Sandwich Shaker," Derrick Equipment Co. (Prior to 1992).

"Derrick Pyramid Screens," Derrick Corp.

(List continued on next page.)

*Primary Examiner*—Donald P. Walsh
*Assistant Examiner*—Daniel Schlak
*Attorney, Agent, or Firm*—Guy McClung

[57] ABSTRACT

A screen is disclosed which, in certain aspects, has screening material between opposed frame sides and one or more lower strips beneath the screen. In one aspect these strips are only inteconnected via their ends and not along their lengths. In certain aspects, a plurality of lower strips are bonded to the screen and extend across the screen from one frame side to the other. In one aspect one or more of the strips has one, two, or more humps or ridges corresponding to one or more corrugations in a corrugated perforated plate and/or corrugated screen assembly which is on the plate or, with no plate present, on the strips. In another aspect instead of the strips a solid corrugated perforated plate is used. In one aspect openings or perforations through the plate are triangular. In one aspect the screen is undulating screening material and lower portions of the screening material are bonded to a plate or to strips. Optionally screen mounting hooks or frame edges or screen edges may be used with such screens. A screening apparatus or shale shaker is disclosed which uses such plates and screens.

20 Claims, 28 Drawing Sheets

6,032,806
Page 2

U.S. PATENT DOCUMENTS

| | | | |
|---|---|---|---|
| 275,340 | 4/1883 | Kimball . | |
| 500,302 | 6/1893 | Stoecket et al. . | |
| 516,673 | 3/1894 | Wilson . | |
| 526,562 | 9/1894 | Cross . | |
| 560,858 | 5/1896 | Missroon . | |
| 583,981 | 6/1897 | Plaisted . | |
| 607,598 | 7/1898 | Closz . | |
| 777,317 | 12/1904 | Traylor . | |
| 865,185 | 9/1907 | Kerrigan . | |
| 948,222 | 2/1910 | Honabach . | |
| 964,897 | 7/1910 | Bryant . | |
| 966,578 | 8/1910 | Murphy et al. | 209/401 X |
| 984,866 | 2/1911 | Tate . | |
| 1,098,979 | 6/1914 | Schuchard . | |
| 1,132,667 | 3/1915 | Milliot . | |
| 1,139,041 | 5/1915 | Larson . | |
| 1,242,982 | 10/1917 | Reynolds . | |
| 1,248,081 | 11/1917 | Couch . | |
| 1,250,768 | 12/1917 | Baumgartner | 209/392 |
| 1,344,747 | 6/1920 | Wright . | |
| 1,397,339 | 11/1921 | Sturtevant . | |
| 1,423,021 | 7/1922 | Reynolds . | |
| 1,462,804 | 7/1923 | Evans . | |
| 1,505,735 | 8/1924 | Stebbins . | |
| 1,561,632 | 11/1925 | Woodward . | |
| 1,614,586 | 10/1927 | Anderson et al. . | |
| 1,626,774 | 5/1927 | Allan . | |
| 1,678,941 | 7/1928 | Helman . | |
| 1,713,143 | 5/1929 | Overstrom . | |
| 1,716,758 | 6/1929 | Bland . | |
| 1,785,195 | 12/1930 | Hoes et al. . | |
| 1,879,377 | 9/1932 | McNeely . | |
| 1,950,861 | 3/1934 | O'Toole, Sr. . | |
| 1,997,713 | 4/1935 | Boehm . | |
| 1,997,740 | 4/1935 | Nickerson . | |
| 2,052,467 | 8/1936 | Hermann | 209/401 |
| 2,061,850 | 11/1936 | Roberts . | |
| 2,082,513 | 6/1937 | Roberts . | |
| 2,089,548 | 8/1937 | Frantz et al. . | |
| 2,104,785 | 1/1938 | Akeyson | 210/384 |
| 2,190,262 | 2/1940 | Geist . | |
| 2,251,909 | 8/1941 | Lindsay | 210/149 |
| 2,274,700 | 3/1942 | Jenks . | |
| 2,335,084 | 11/1943 | Rice | 209/408 |
| 2,406,051 | 8/1946 | Weiss . | |
| 2,462,878 | 3/1949 | Logue . | |
| 2,480,320 | 8/1949 | Carrier | 210/388 |
| 2,511,239 | 6/1950 | Behnke et al. | 209/403 |
| 2,648,441 | 8/1953 | Soldan . | |
| 2,667,975 | 2/1954 | Seaholm | 210/152 |
| 2,670,079 | 2/1954 | Betts | 209/405 |
| 2,677,462 | 5/1954 | Conkling | 209/403 |
| 2,723,032 | 11/1955 | Gisler et al. . | |
| 2,726,184 | 12/1955 | Cox et al. . | |
| 2,774,477 | 12/1956 | Pollitz | 209/403 |
| 2,800,227 | 7/1957 | Kiger | 209/412 X |
| 2,813,629 | 11/1957 | Brugmann | 209/403 |
| 2,827,169 | 3/1958 | Cusi . | |
| 2,902,165 | 9/1959 | Imershein . | |
| 2,929,464 | 3/1960 | Sprouse . | |
| 2,973,865 | 3/1961 | Cibula | 209/315 |
| 2,980,208 | 4/1961 | Neumann . | |
| 2,985,303 | 5/1961 | Wright . | |
| 3,057,481 | 10/1962 | Pale | 210/493 |
| 3,070,231 | 12/1962 | McCorkel et al. | 209/319 |
| 3,092,573 | 6/1963 | Lambert et al. | 209/403 |
| 3,165,473 | 1/1965 | Pall et al. | 210/510 |
| 3,176,843 | 4/1965 | Hoskins et al. | 209/403 |
| 3,243,943 | 4/1966 | Getzin | 55/499 |
| 3,255,885 | 6/1966 | Burls | 209/314 |
| 3,285,413 | 11/1966 | Taylor-Smith . | |
| 3,458,978 | 8/1969 | Davis | 55/499 |
| 3,465,413 | 9/1969 | Rosaen et al. | 29/428 |
| 3,542,636 | 11/1970 | Wandel | 161/114 |
| 3,574,103 | 4/1971 | Latkin | 428/72 |
| 3,655,060 | 4/1972 | Hagdahl | 210/493 |
| 3,679,057 | 7/1972 | Perez | 210/223 |
| 3,716,138 | 2/1973 | Lumsden | 209/401 |
| 3,747,770 | 7/1973 | Zentis | 210/402 |
| 3,747,772 | 7/1973 | Brown | 210/493 |
| 3,789,498 | 2/1974 | Cole | 29/470.9 |
| 3,793,692 | 2/1974 | Tate et al. | 29/163.5 |
| 3,853,529 | 12/1974 | Boothe et al. | 55/499 |
| 3,900,628 | 8/1975 | Stewart . | |
| 4,019,987 | 4/1977 | Krashow | 210/232 |
| 4,022,596 | 5/1977 | Pedersen | 55/528 |
| 4,033,865 | 7/1977 | Derrick, Jr. | 209/275 |
| 4,062,769 | 12/1977 | Simonson | 209/399 |
| 4,075,106 | 2/1978 | Yamazaki | 210/487 |
| 4,138,303 | 2/1979 | Taylor | 156/264 |
| 4,380,494 | 4/1983 | Wilson | 209/319 |
| 4,410,427 | 10/1983 | Wydeven | 210/317 |
| 4,464,242 | 8/1984 | Boulton | 204/253 |
| 4,472,473 | 9/1984 | Davis et al. | 428/184 |
| 4,546,783 | 10/1985 | Lott | 134/109 |
| 4,575,421 | 3/1986 | Derrick et al. | 209/397 |
| 4,582,597 | 4/1986 | Huber | 204/313 |
| 4,589,983 | 5/1986 | Wydeven | 210/317 |
| 4,617,122 | 10/1986 | Kruse et al. | 210/493.3 |
| 4,634,535 | 1/1987 | Lott | 210/780 |
| 4,678,578 | 7/1987 | Nodes et al. | 210/445 |
| 4,696,751 | 9/1987 | Eifling | 210/780 |
| 4,728,422 | 3/1988 | Bailey | 210/314 |
| 4,769,968 | 9/1988 | Davis et al. | 52/814 |
| 4,820,407 | 4/1989 | Lilie | 209/397 |
| 4,832,834 | 5/1989 | Baird, Jr. | 209/397 |
| 4,857,176 | 8/1989 | Derrick et al. | 209/392 |
| 4,882,054 | 11/1989 | Derrick et al. | 210/389 |
| 4,940,500 | 7/1990 | Tado Koro et al. | 156/204 |
| 4,954,249 | 9/1990 | Gero et al. | 209/273 |
| 5,028,474 | 7/1991 | Czaplicki | 428/178 |
| 5,084,178 | 1/1992 | Miller et al. | 210/493.5 |
| 5,137,622 | 8/1992 | Souter | 209/403 |
| 5,139,154 | 8/1992 | Gero et al. | 209/273 |
| 5,162,143 | 11/1992 | Porter et al. | 428/179 |
| 5,167,740 | 12/1992 | Michaelis et al. | 156/73.1 |
| 5,211,291 | 5/1993 | Kelley et al. | 209/680 |
| 5,221,008 | 6/1993 | Derrick, Jr. et al. | 209/269 |
| 5,256,292 | 10/1993 | Cagle | 210/499 |
| 5,312,508 | 5/1994 | Chisholm | 156/292 |
| 5,330,057 | 7/1994 | Schiller et al. | 209/392 |
| 5,385,669 | 1/1995 | Leone, Sr. | 210/488 |
| 5,392,925 | 2/1995 | Seyffert | 209/405 |
| 5,417,793 | 5/1995 | Bakula | 156/308.2 |
| 5,417,858 | 5/1995 | Derrick et al. | 210/388 |
| 5,417,859 | 5/1995 | Bakula | 210/388 |
| 5,490,598 | 2/1996 | Adams | 209/403 X |
| 5,614,094 | 3/1997 | Deister et al. | 210/388 |
| 5,636,749 | 6/1997 | Wojclechowski | 209/403 |
| 5,720,881 | 2/1998 | Derrick et al. | 210/388 |
| 5,851,393 | 12/1998 | Carr et al. | 204/489 |
| 5,868,929 | 9/1999 | Derrick et al. | 210/388 |
| 5,876,552 | 3/1999 | Bakula | 156/308.2 |

FOREIGN PATENT DOCUMENTS

| | | |
|---|---|---|
| 2161715A | of 1984 | United Kingdom . |
| 2161715B | of 1984 | United Kingdom . |
| PCT/GB91/00957 | of 1991 | WIPO . |
| PCT/US94/00243 | of 1994 | WIPO . |

PCT/EP96/03103 of 1996 WIPO .

OTHER PUBLICATIONS

"Advanced Wirecloth, Inc.," Advanced Wirecloth, Inc., 1993.

"CPI Group, Inc.," CPI Group, Inc., 1990.

"LM3 Full–Flo ™Shale Shaker," Sweco Oilfield Services, 1991.

"The Future of Fine Screening," Derrick Equipment Co. 1993.

Pending U.S. application No. 08/220,101 filed Mar. 30, 1994 entitled "Screen For Vibrating Separator."

Amendment Under 37 CFR 1.115 in pending U.S. application No. 08/220,101.

Mcnally Coal Preparation Manual M 576, pp. iii,73–96, 216 (1978).

Layered Shale Shaker Screens Improve Mud Solids Control, World Oil, 1978.

The Brandt Company General Catalog 1982–1983, 4 pages, 1982.

Take the Drilled Solids Out, The Brandt Company, Sep. 1980.

Sweco Full–Flow, Sweco, Inc. 1992.

Catalog 105 H&K Perforated Materials, Harrington & King–Perforating Co., 1988.

Sweco Oilfield Services, Composite Catalog, 1992.

Screening Equipment Handbook, Pankratz, 1988.

Supertaut Mud Cleaner Screens, Sweco Oilfield Services, 1992.

Filtration & Separation, Flo Trend Systems, Inc. 1989.

Clean Liquids/Dry Solids, Flo Trend Systems, Inc. 1989.

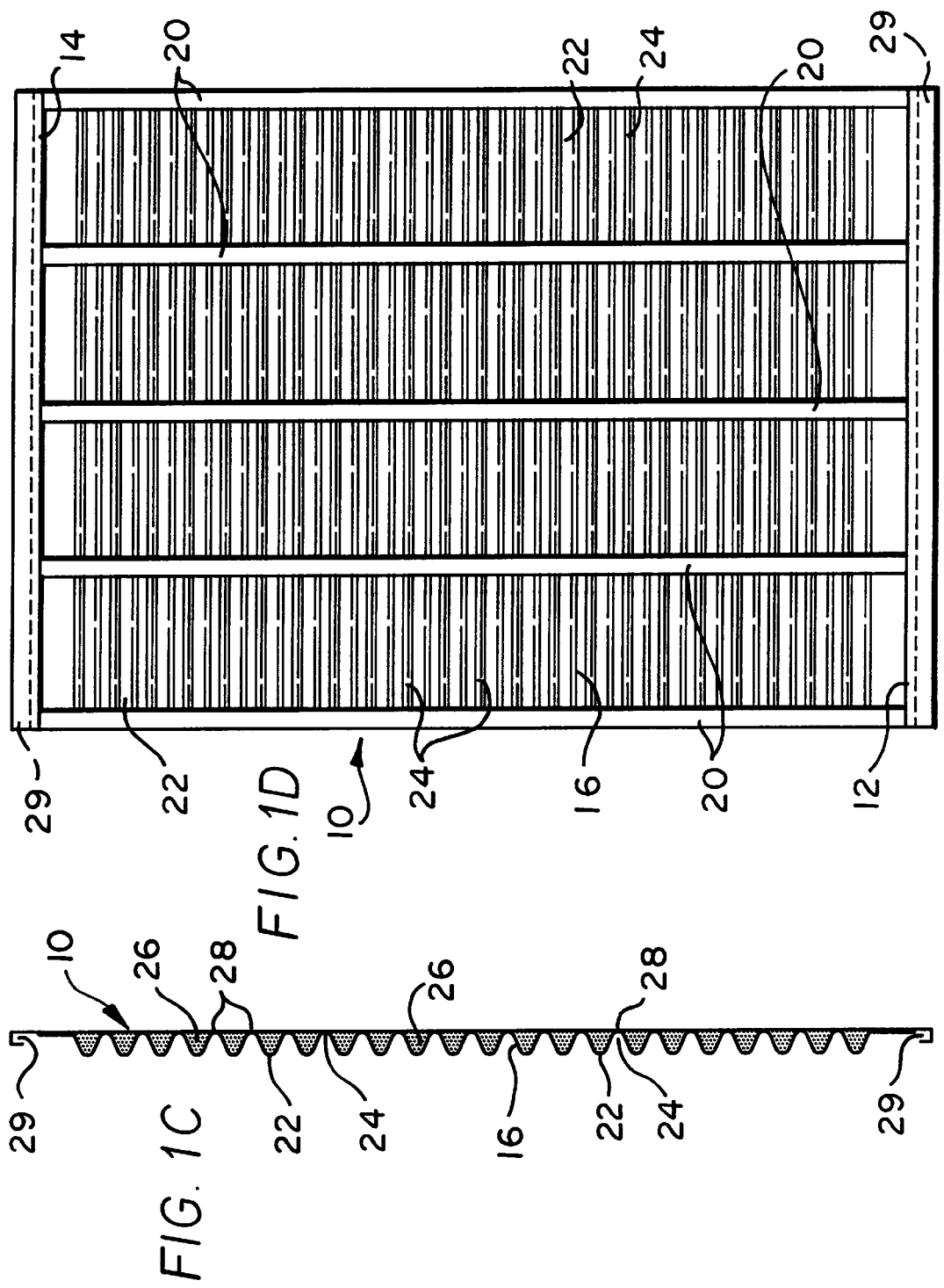

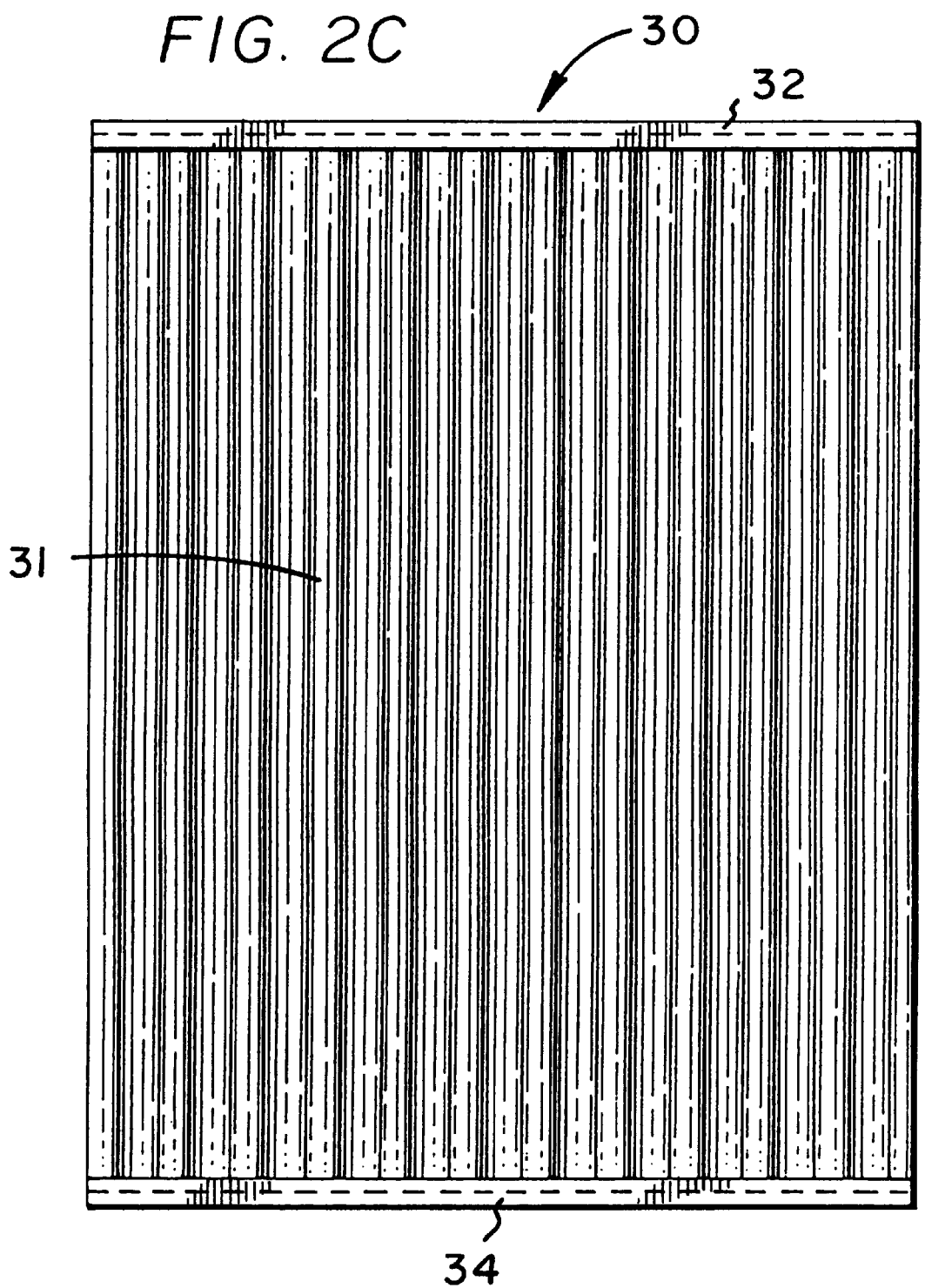

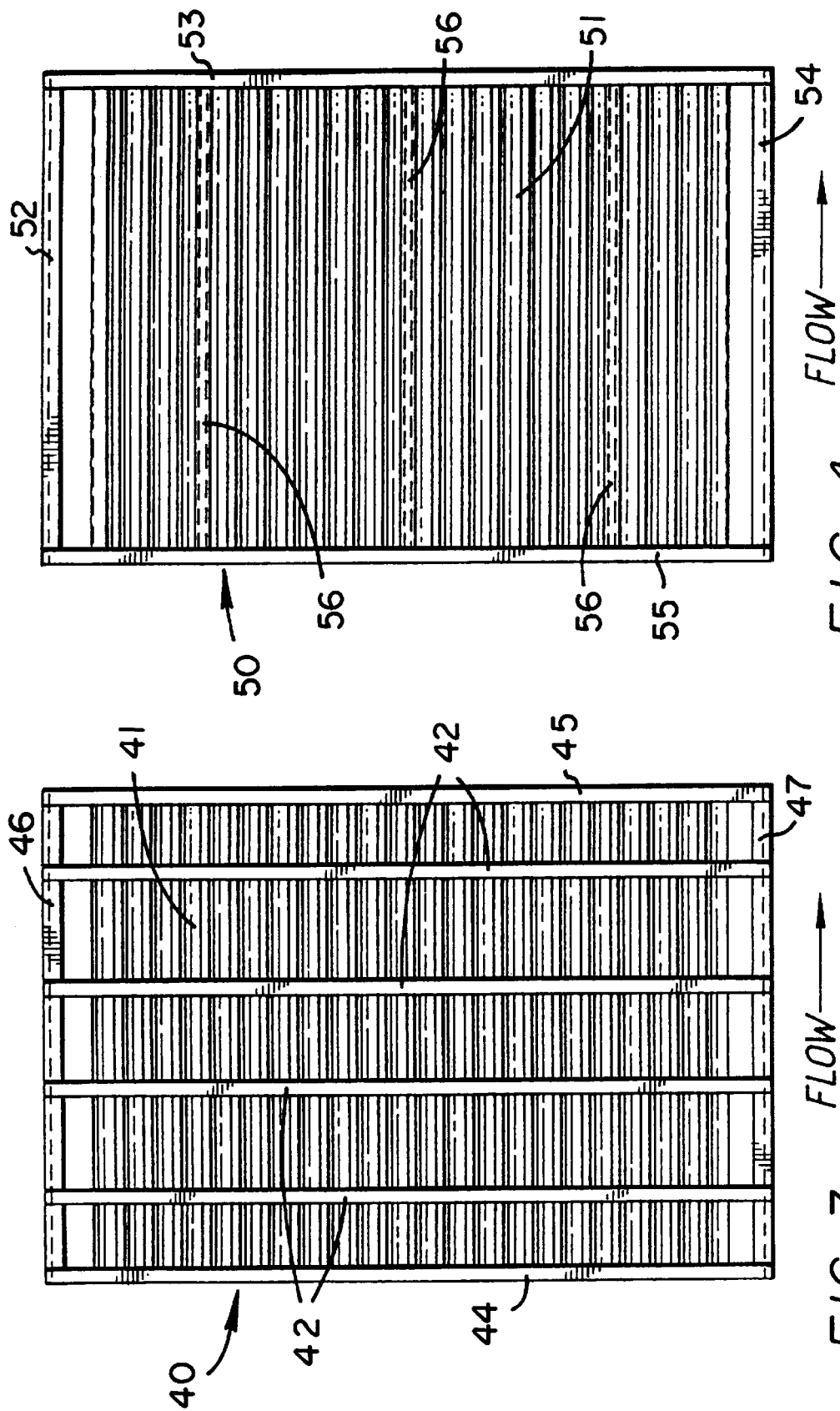

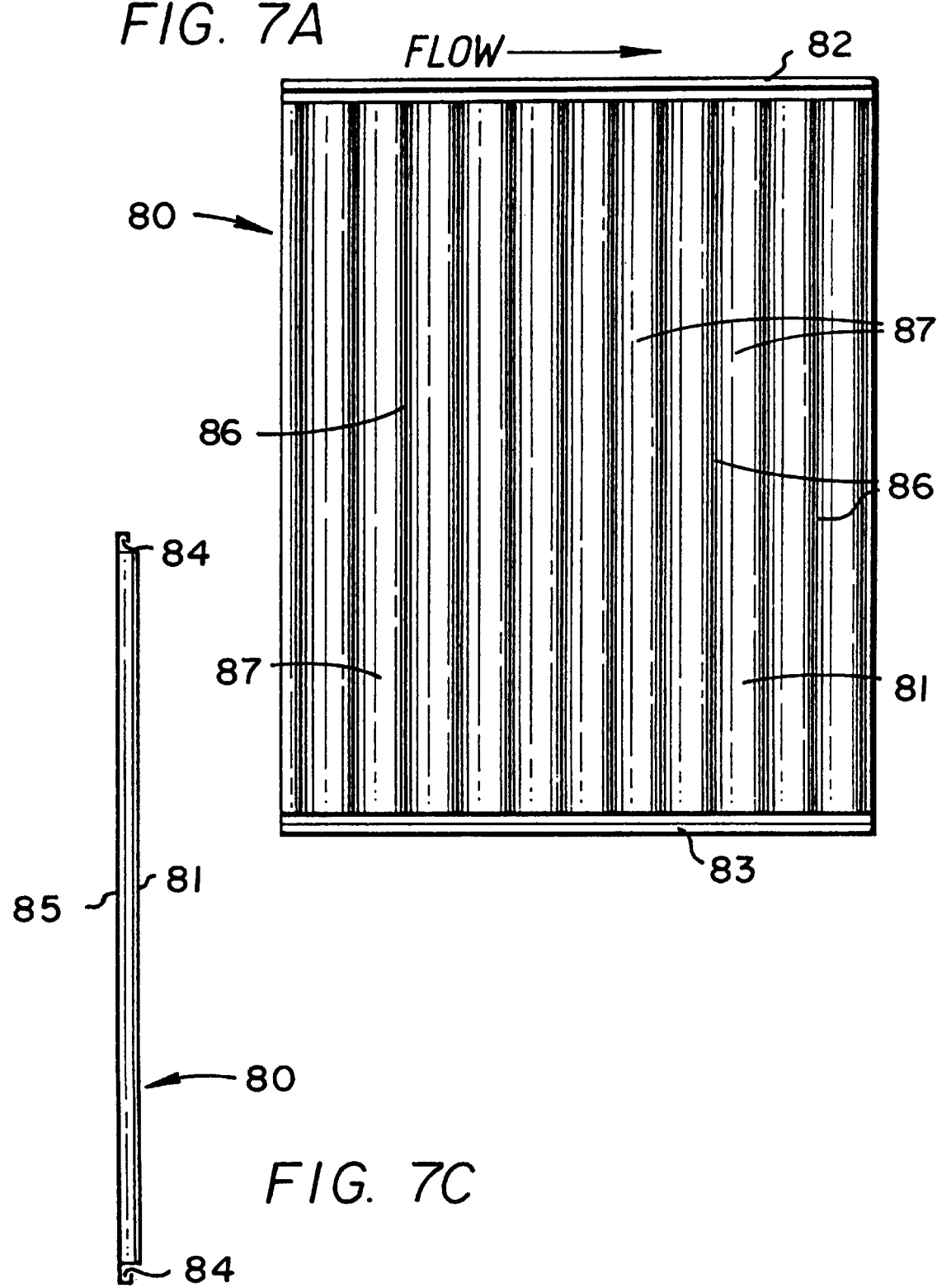

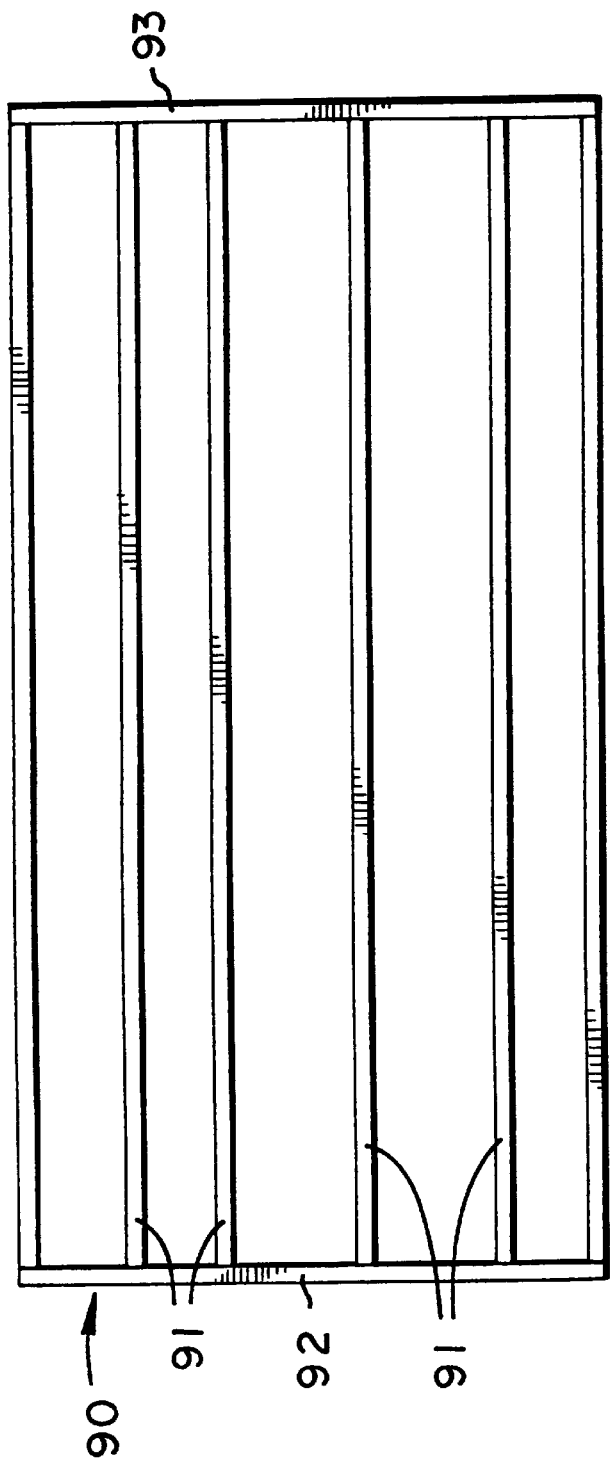
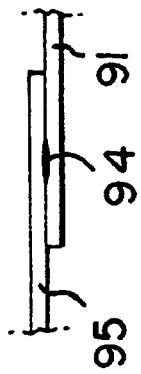
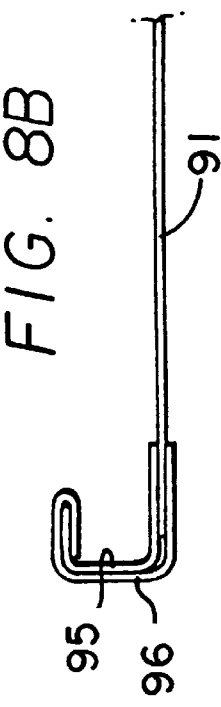

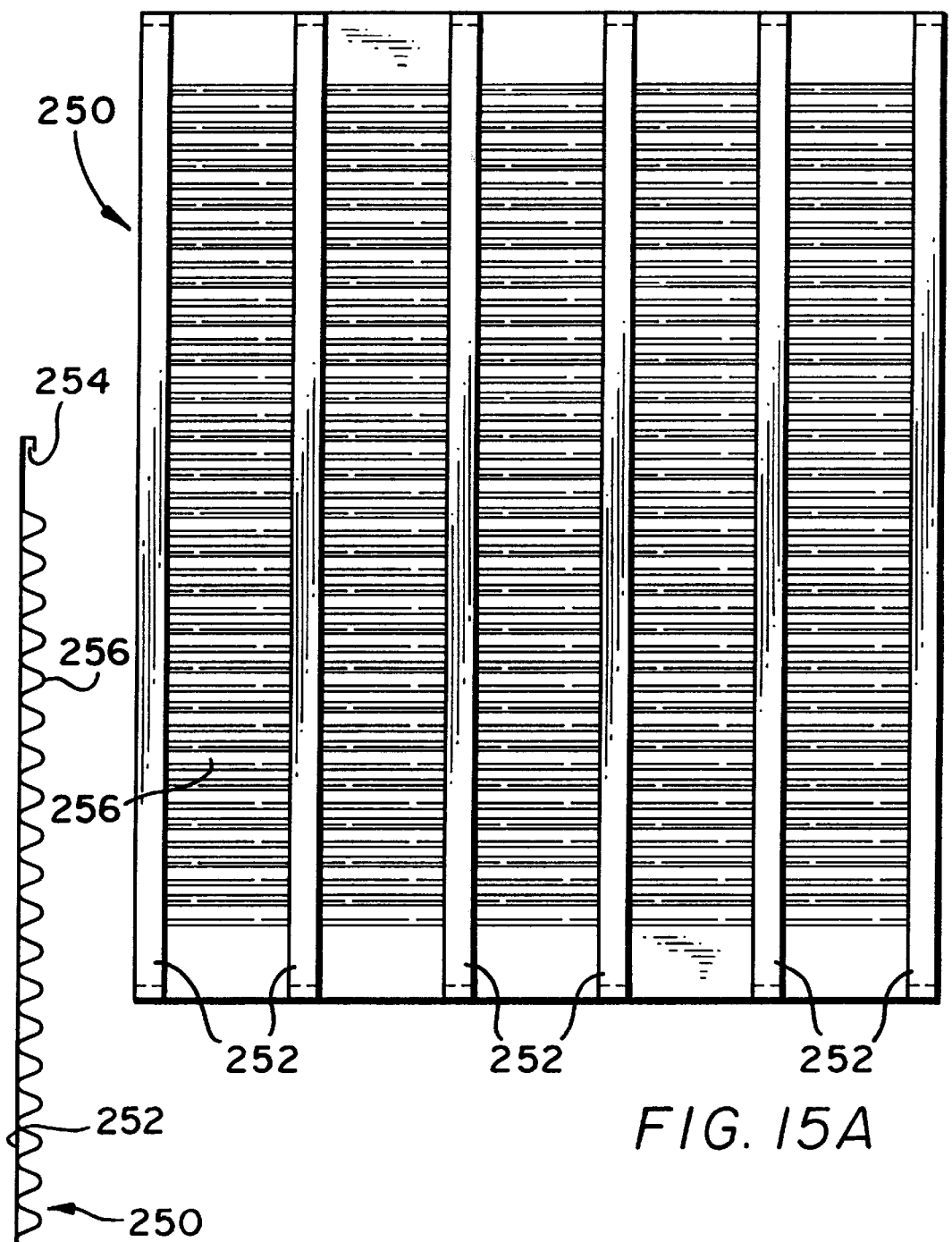
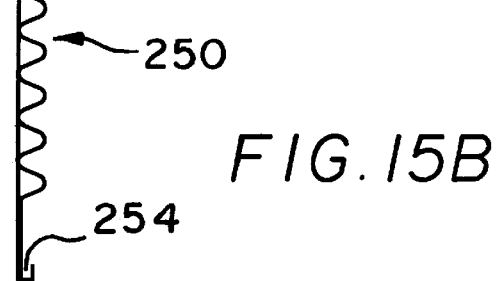
FIG. 15A
FIG. 15B

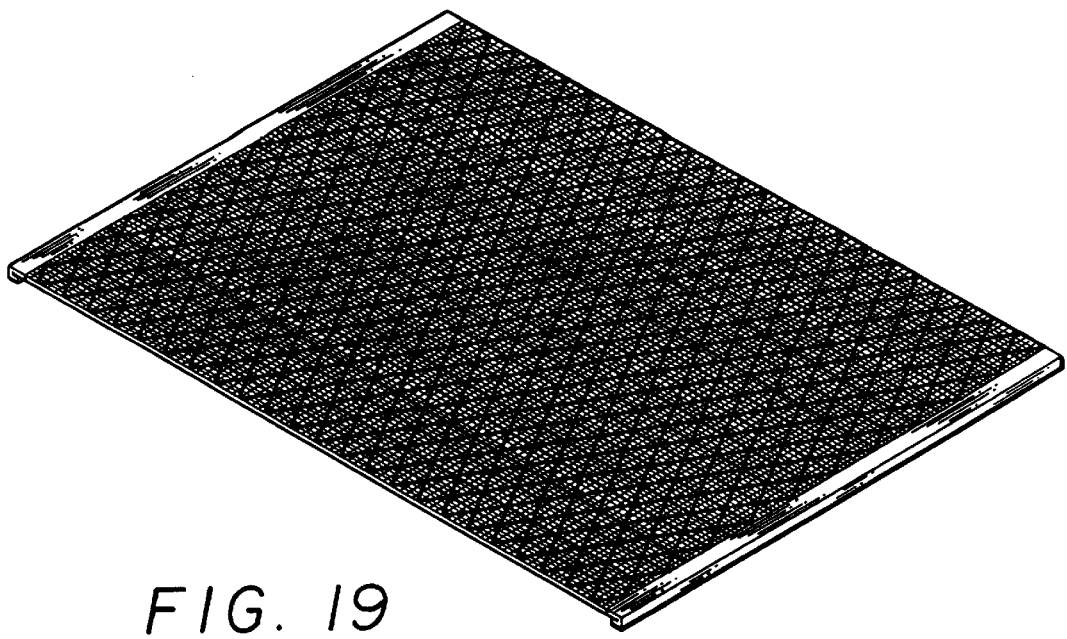
FIG. 19
FIG. 20
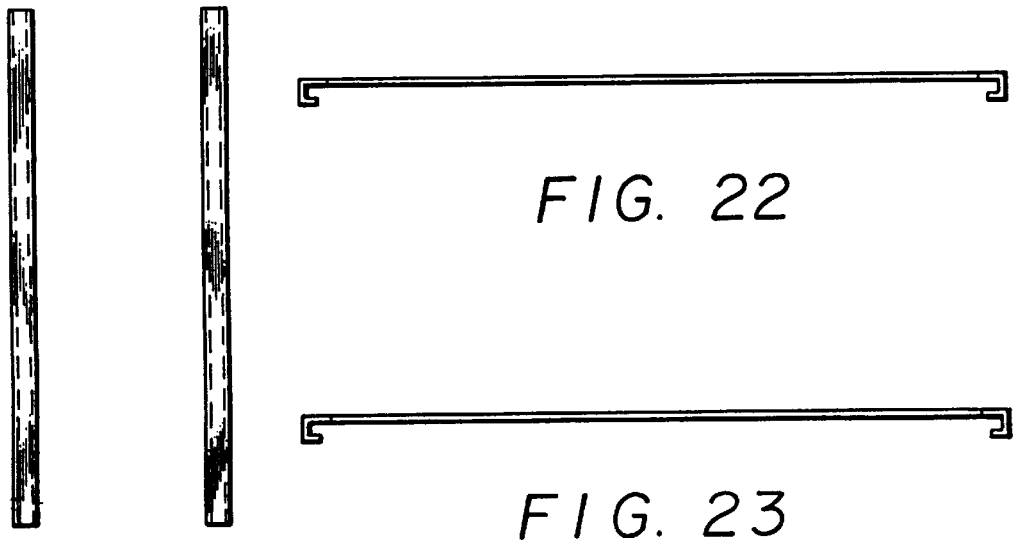
FIG. 22
FIG. 23
FIG. 21

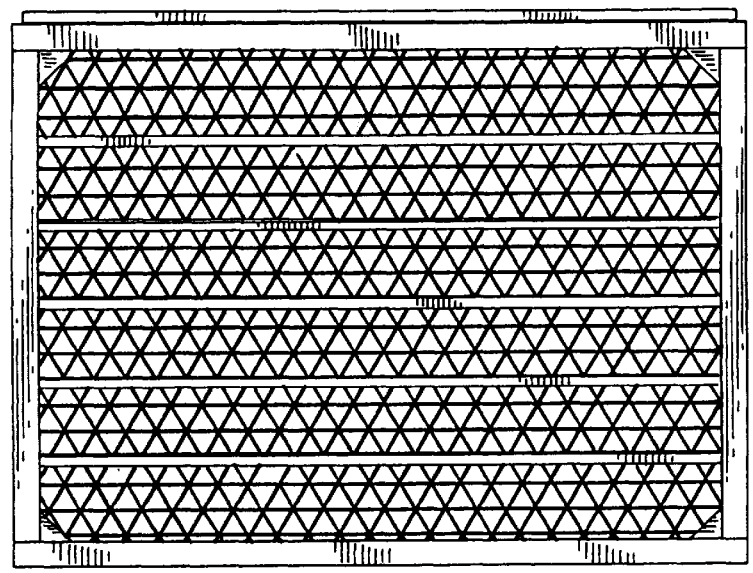
FIG. 28
FIG. 29
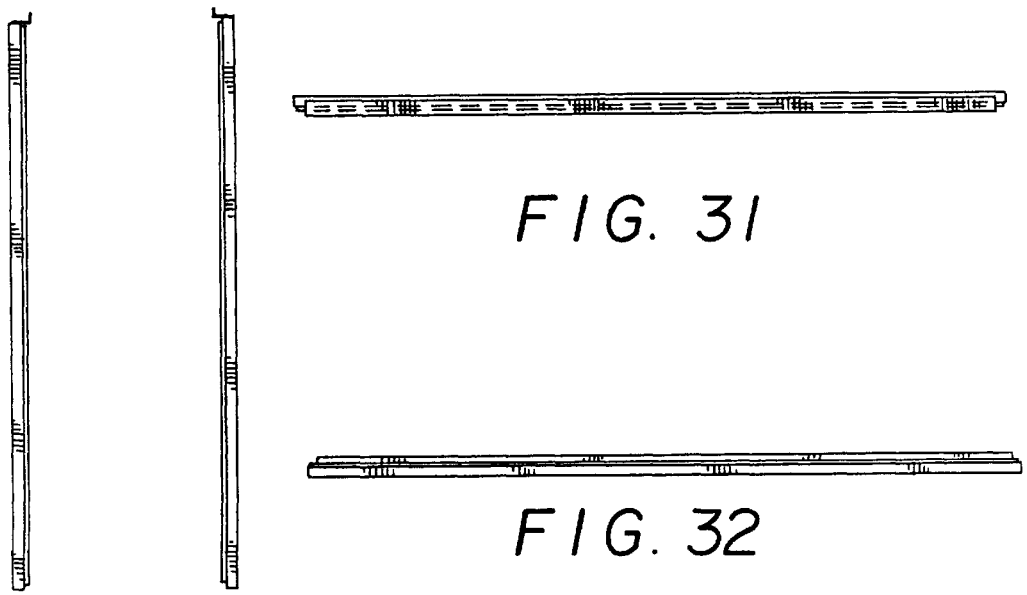
FIG. 31
FIG. 32
FIG. 30

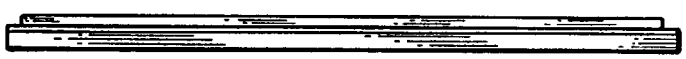
FIG. 35
FIG. 36
FIG. 37
FIG. 38

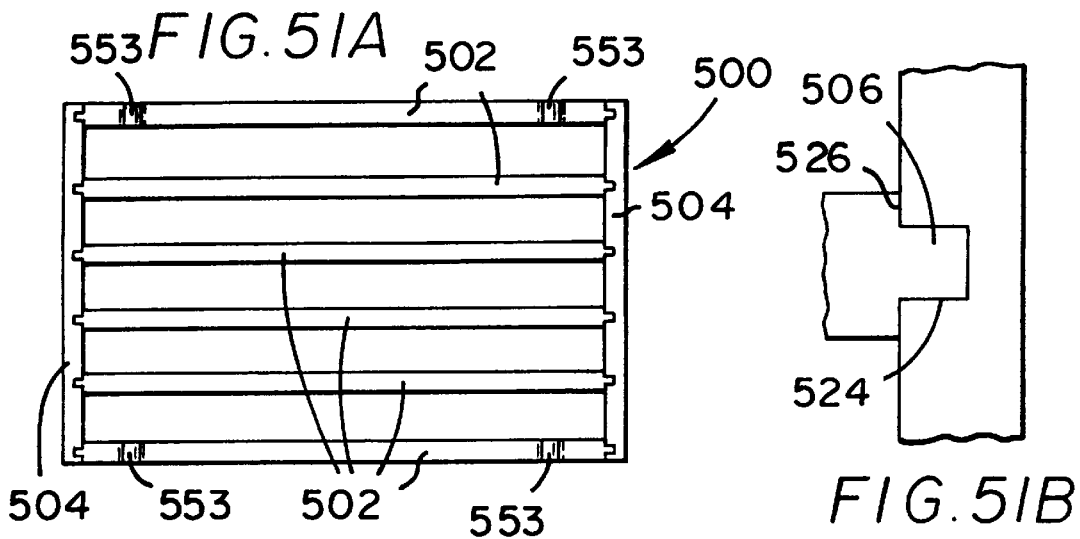
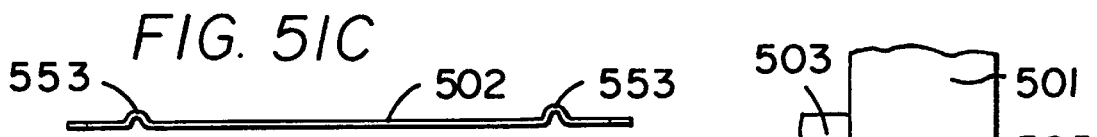
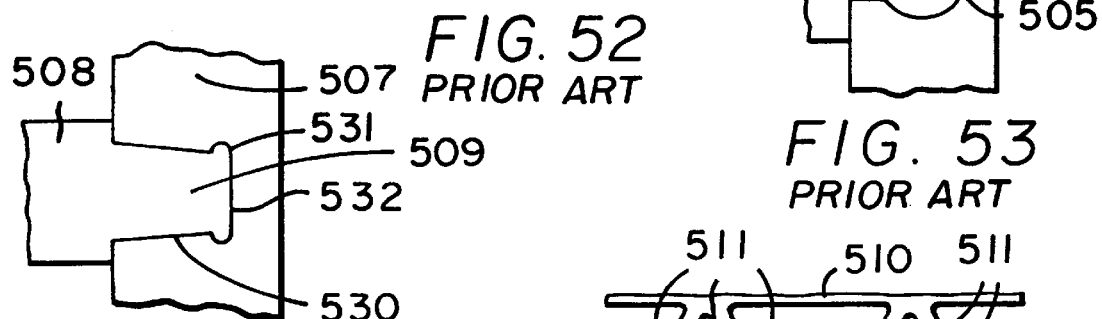
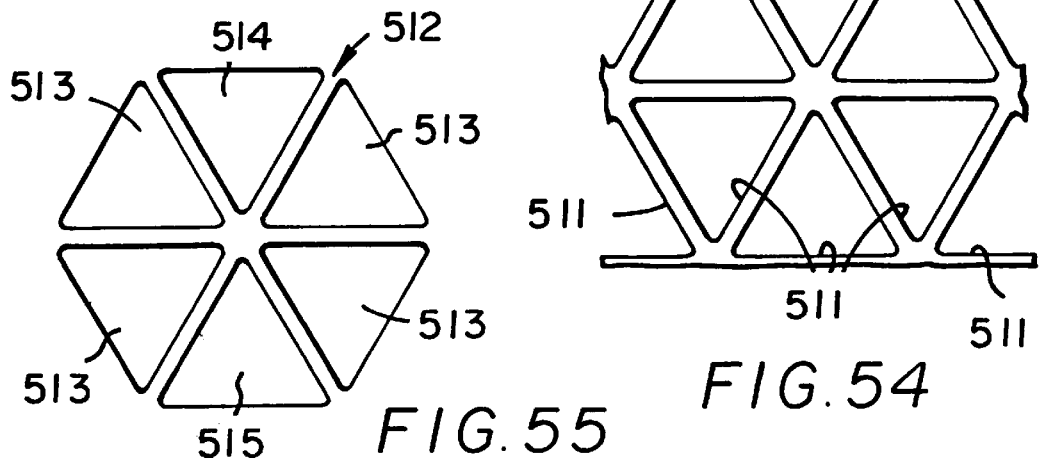

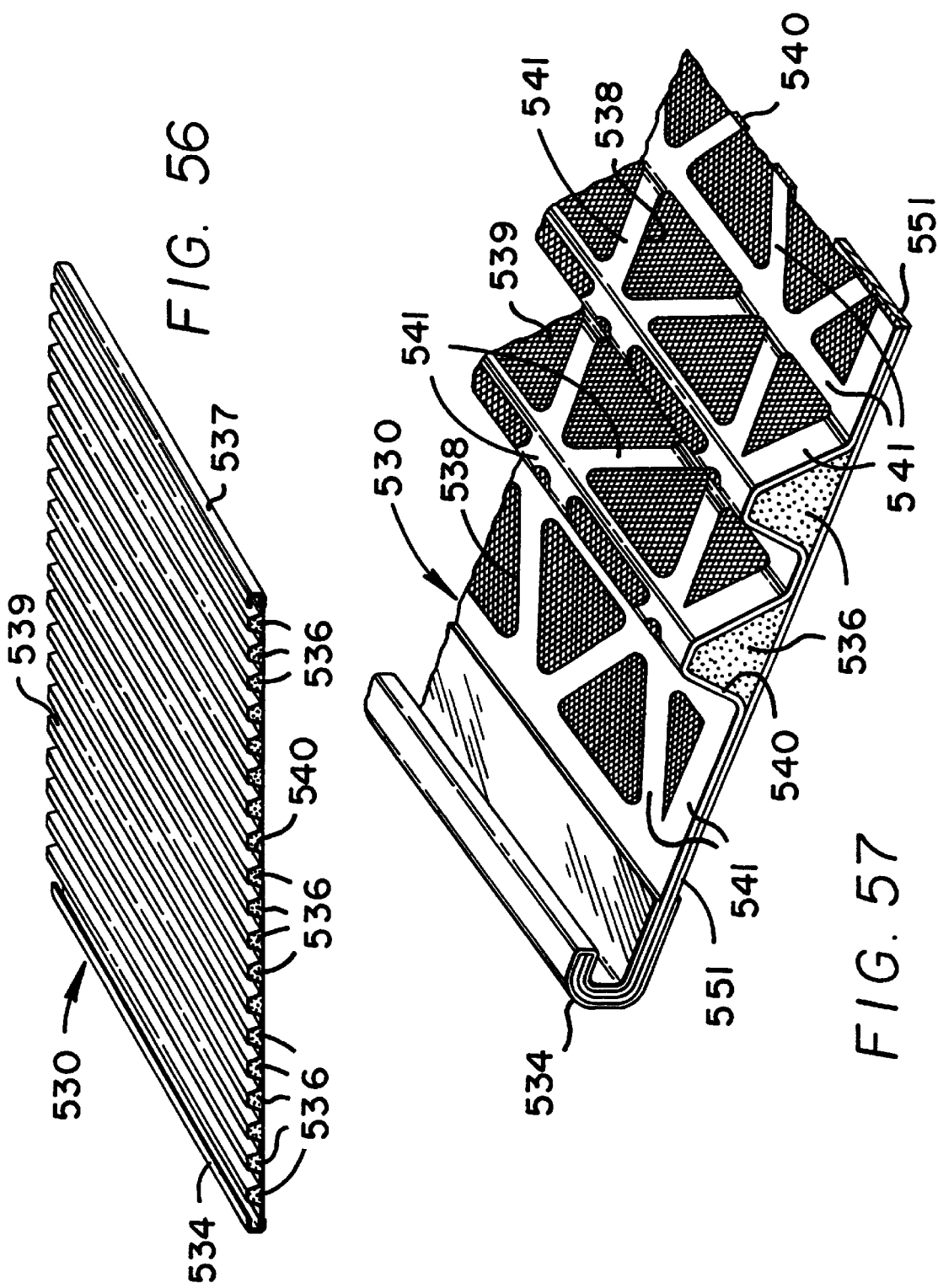

SCREEN APPARATUS FOR VIBRATORY SEPARATOR

RELATED APPLICATIONS

This application is a division of U.S. application Ser. No. 08/786,515 filed Jan. 21, 1997 which is a continuation in part of the following co-owned applications and patents: U.S. Ser. No. 29/048,575 filed Jan. 4, 1996, now U.S. Pat. No. D 377,636, which is a continuation of U.S. Ser. No. 29/014,571, now U.S. Pat. No. D 366,040 issued on Jan. 9, 1996 which is a continuation-in-part of U.S. applications: Ser. No. 07/956,123 filed Apr. 30, 1993, now U.S. Pat. No. 5,385,669 issued on Jan. 31, 1995; and Ser. No. 08/105,696 filed Aug. 12, 1993, now U.S. Pat. No. 5,392,925 issued on Feb. 28, 1995; U.S. Ser. No. 08/504,495 filed Jul. 20, 1995 entitled "Shale Shaker Screen" issued as U.S. Pat. No. 5,598,930 on Feb. 4, 1997; U.S. Ser. No. 08/598,566 filed Feb. 12, 1996 now abandoned entitled "Screen For Vibrating Separator" which is a continuation-in-part of U.S. Ser. No. 08/220/101 filed Mar. 30, 1994 now U.S. Pat. No. 5,490,598 issued Feb. 13, 1996. All of these related applications and patents are incorporated herein in their entirety for all purposes.

BACKGROUND OF THE INVENTION

1. Field of the Invention

The present invention is directed to vibratory screens, to filtering screens, to such screens that are generally flat or that are not flat, to devices with such screens, and to shale shakers with such screens, and to shakers for separating particles.

2. Description of Related Art

The need for solids control in drilling mud used in hydrocarbon well drilling is well known in the prior art. Drilling mud, typically a mixture of clay and water and various additives, is pumped down through a hollow drill string (pipe, drill collar, bit, etc.) into a well being drilled and exits through holes in a drillbit. The mud picks up cuttings (rock) and other solids from the well and carries them upwardly away from the bit and out of the well in a space between the well walls and the drill string. At the top of the well, the solids-laden mud is discharged over a shale shaker, a device which typically has a series of screens arranged in tiered or flat disposition with respect to each other. The prior art discloses a wide variety of vibrating screens, devices which use them, shale shakers, and screens for shale shakers. The screens catch and remove solids from the mud as the mud passes through them. If drilled solids are not removed from the mud used during the drilling operation, recirculation of the drilled solids can create weight, viscosity, and gel problems in the mud, as well as increasing wear on mud pumps and other mechanical equipment used for drilling.

In some shale shakers a fine screen cloth is used with the vibrating screen. The screen may have two or more overlying layers of screen cloth. The prior art discloses that the layers may be bonded together; and that a support, supports, or a perforated or apertured plate may be used beneath the screen or screens. The frame of the vibrating screen is resiliently suspended or mounted upon a support and is caused to vibrate by a vibrating mechanism, e.g. an unbalanced weight on a rotating shaft connected to the frame. Each screen may be vibrated by vibratory equipment to create a flow of trapped solids on top surfaces of the screen for removal and disposal of solids. The fineness or coarseness of the mesh of a screen may vary depending upon mud flow rate and the size of the solids to be removed.

Many screens used with shale shakers are flat or nearly flat (i.e. substantially two-dimensional). Other screens, due to corrugated, depressed, or raised surfaces are three-dimensional. U.S. Pat. Nos. 5,417,793; 5,417,858; and 5,417,859 disclose non-flat screens for use with shale shakers. These screens have a lower planar apertured plate with a multiplicity of spaced-apart apertures or openings therethrough. Undersides of troughs of undulating screening material are bonded to the apertured plate. Such screens present a variety of problems, deficiencies, and disadvantages, including: decreased flow area due to area occluded by solid parts of the apertured plate; necessity to either purchase relatively expensive apertured plate or provide for in-house perforating of a solid plate; plate weight increases wear on parts such as rubber screen supports or cushions and can inhibit required vibration; large plate surface area requires relatively large amount of bonding means for bonding screens to the plate; and a finished screen which is relatively heavy increases handling problems, hazards, and cost of shipping.

Vibrating screens have been employed for many years to separate particles in a wide array of industrial applications. One common application of vibrating screens is in drilling operations to separate particles suspended in drilling fluids. The screens are generally flat and are mounted generally horizontally on a vibrating mechanism or shaker that imparts either a rapidly reciprocating linear, elliptical or circular motion to the screen. Material from which particles are to be separated is poured onto a back end of the vibrating screen, usually from a pan mounted above the screen. The material generally flows toward the front end of the screen. Large particles are unable to move through the screen remaining on top of the screen and moving toward the front of the screen where they are collected. The smaller particles and fluid flows through the screen and collects in a pan beneath the screen.

A vibrating screen may be formed from one or more layers of wire mesh. Wire mesh is generally described with reference to the diameter of the wires from which it is woven, the number wires per unit length (called a mesh count) and the shape or size of the openings between wires. Wire mesh comes in various grades. "Market" grade mesh generally has wires of relative large diameter. "Mill" grade has comparatively smaller diameter wires and "bolting cloth" has the smallest diameter wire. The type of mesh chosen depends on the application. Smaller diameter wires have less surface and thus less drag, resulting in greater flow rates. Smaller diameter wires also result, for a given opening size, in a larger percentage of open area over the total area of the screen, thus allowing greater flow rates and increased capacity. However, screens of bolting cloth tears more easily than market or mill grade screens, especially when used in harsh conditions such as drilling and mining operations. The smaller diameter wires tend to have less tensile strength and break more easily, and the finer mesh also tends not to retain its shape well.

Most meshes suffer from what is termed as "near sized particle blinding. During vibration, wires separate enough to allow particles of substantially the same size or slightly larger than the openings to fall between the wires and become ledged, thus "blinding" the openings of the screen and reducing capacity of the screen. If a particle becomes lodged when the wires are at a maximum distance apart, it is almost impossible to dislodge the particle. Sometimes, however, wires will subsequently separate further to release the lodged particle. Unfortunately, some wire mesh, especially bolting cloth, is tensioned. Tensioning restricts movement of the wires. Restricting movement assists in holding the shape of the wire mesh, keeping the size of the openings consistent to create a more consistent or finer "cutting point" and reducing abrasion from wires rubbing against each other. However, restricted movement of the wires reduces the probability that, once a near sized particle becomes stuck, the wires will subsequently separate to allow the particle to pass. Use of smaller diameter wires, with smaller profiles, helps to reduce blinding. With a smaller diameter wire, a particle is less likely to become lodged midway through the opening.

Multiple layers of mesh may be used to alleviate blinding. U.S. Pat. No. 4,033,865, describes layering two meshes in a manner that results in at least one wire of the lower of the two meshes bisecting each opening in the upper mesh. The openings in each mesh are at least twice as wide as the diameters of the wires and the lower mesh has openings the same size as or slightly larger than the openings in the upper mesh. The lower mesh, when held tightly against the upper mesh, prevents particles from migrating far enough into an opening in the upper mesh to be trapped. Some relative movement of the layers also helps to dislodge particles caught in the upper layer. The two-layer arrangement has the further benefit of a finer "cutting point," allowing smaller particles to be separated out. A third "backing" layer of relatively coarse, mill grade mesh is often used to carry most of the load on the screen and to increase the tensile strength of the screen.

Another problem faced in most applications is the tearing of the screen. The problem can be especially acute in heavy duty applications such as drilling and mining. A torn screen must be replaced or repaired. To facilitate repair, the screen layers are bonded to a rigid or semi-rigid support panel that has a pattern of large openings, forming on the screen a plurality of small cells of wire mesh. When a tear occurs in the screen, the mesh remaining within the cell in which the tear occurred is cut out and the cell is plugged. The capacity of the screen is diminished but its life is extended. Typically, several cells of a screen can be repaired before its capacity drops far enough to require replacement. Unfortunately, bonding the screen to the support panel further restricts relative movement of the layers and the wires in each mesh layer, thus compounding the problem of blinding.

Blinding and tearing of the screens reduce the capacity of the screen continually through its useful life. Although capacity can be increased by increasing the total area the screens, the size of the screen is limited in most applications, such as on drilling rigs, especially those on offshore platforms. There has thus been generally a trade-off between capacity, longevity, repairability and resistance to blinding of the screens.

There is a need for a supported (either non-flat or flat) screen which is consumable, efficient and cost-effective, yet readily and inexpensively made, easy to handle, and relatively inexpensive to transport.

SUMMARY OF THE PRESENT INVENTION

The present invention discloses, in certain embodiments, a screen for vibrating screen apparatus. The screen has one or more upper layers of screen, screen cloth, and/or mesh. If more than one layer is used, they may be bonded together at discrete points, at discrete areas, or over their entire surface. The layer or layers are mounted on frame apparatus which may include a solid side support on each of two spaced apart sides of the layer(s), or may include a full four sided screen frame. A strip or strips of support material (e.g. flat steel, aluminum or plastic strips—of any width, but in certain preferred embodiments ranging between a half inch to three inches in width; and of any thickness, but in certain preferred embodiments ranging between one-thirty second and one-eighth inches thick, or rods of these materials with a diameter between one-thirty second and one-eighth inches; any screen may use strips made from different materials, e.g. cross-strips of plastic and end strips of steel, or vice versa) are secured across two or more frame sides. With respect to a two sided frame wherein the two sides are parallel and spaced apart, a strip or strips may be, according to this invention, disposed parallel to the two sides; and, if more than one strip is used, spaced apart across the area of the layer or layers. It is also within the scope of this invention to use a strip or strips which are disposed in a manner non-parallel to the two sides. In one aspect such non-parallel strips may extend diagonally from one end of one side of the frame, across the layer or layers, to a diagonally opposite end of the other side. In another aspect such a strip may extend from any point of a frame side to any point on a non-framed side of the layer or layers. Any such strip (or rod) may be bonded, sintered, welded or otherwise secured (herein referred to collectively as "bonded") at any point to the layer or layers; at substantially every point of contact between the strip(s) and the layer(s); or at selected intermediate contact points.

In certain embodiments a screen assembly for a vibratory separator is provided that has a corrugated support plate having a plurality of alternating raised portions and lower portions, the corrugated support plate having a plurality of spaced apart openings therethrough, a screen frame with a first pair of spaced apart first sides and a second pair of spaced apart second sides, the first sides spaced apart by the second sides and connected thereto, the frame having a plurality of spaced apart support strips extending beneath the corrugated support plate, each support strip independent of and not connected to the other support strips along its length, each support strip having two spaced apart ends each connected to a spaced apart side of the frame and to which the corrugated support plate is secured. Such a screen assembly may, optionally, have at least one projecting portion on each support strip for reception within a raised portion of the corrugated support plate, and screening material on the corrugated support plate.

In certain embodiments such a strip (or strips) is used with an undulating three-dimensional layer or layers of screen, screen cloth, screen mesh, or some combination thereof (either non-bonded layers or bonded layers if multiple layers are present). If the undulating layer(s) present certain downwardly projecting areas, e.g. troughs between valleys, some or all of the troughs may, within the scope of this invention, be bonded to the strip(s) or portions thereof, and all or only a portion of a trough may be bonded to the strip(s).

Certain prior art shaker screens have a frame side with an in-turned edge which facilitates hooking of the screen, e.g. to a vibrating basket. In one embodiment of the present invention a strip as described above extending between two frame sides also extends into and becomes this in-turned hooked edge. In another aspect a strip is secured to a portion of a hook. To inhibit or prevent fluid leakage at the hook/strip interface, a steel strip may be welded to a metal hook (or a non-metal strip may be bonded to a metal or non-metal hook). In one aspect typical frame sides are not used and only a series of strips with hook edges support the screening material and provide for its mounting to a shale shaker.

In other embodiments in which two frame sides are used, support strips at opposite ends of the frame sides may also serve as end members across the layer(s) ends which do not have frame sides. In one aspect such strips are emplaced at the leading and trailing edges of the layers.

In embodiments of this invention in which the layer (or layers) are non-flat (e.g. undulating) and there is some sort of extended depressed or lower areas on or across the layers which provide a generally lower path for fluid moving on part of or all the way across a screen, the strip or strips according to this invention may be placed beneath the layer or layers at any desired angle to the direction of flow of the fluid across the screen. Also, in those cases in which the entire screen surface has undulations in a same general direction, the screen may be disposed so that fluid flows across the screen either generally in the same direction as the undulations or transverse to such a direction. In either case, a strip or strips beneath the layer(s) may be in the direction of flow or transverse to it.

In one aspect the strips (or rods) described above have one or more projecting portions formed integrally thereof or secured thereto which project into troughs or areas of the layer(s). Such projecting portions may be shaped and configured to mate with the shape of a hill, valley, trough or indented area; may be bonded to the layer(s) at such areas; may be bonded only to the sides of such areas and not to the uppermost portion of a top portion thereof; or may be adjacent such areas without bonding thereto. If there is a series of parallel troughs or a plurality of adjacent indented areas, such projections may be provided in all such troughs or areas; in only on such trough or area; in troughs or areas only adjacent frame sides; or in only middle troughs or areas. It is within the scope of this invention in embodiments in which the screen has a series of parallel troughs, to use alternating flat strips and strips with one or more projections as described above. It is also within the scope of this invention to use non-flat strips which have a shape that corresponds to the series of troughs, e.g. with undulating layer(s), a corresponding undulating strip is used. Such strips may be used instead of or in combination with flat strips as previously described. Any strip herein may have holes through it to facilitate fluid flow. In one aspect any strip, combination of strips, or pattern of strips disclosed herein may be used with a generally flat ("two-dimensional") screen. In any screen disclosed herein the screening material may be sintered to itself, individual screen wires may be sintered to each other, one or more layers of screen material, cloth, mesh, or screen may be sintered to each other; and any screen material may be sintered to any strip disclosed herein, either entirely along its length or at selected points or areas therealong.

The present invention, in one embodiment includes a shale shaker with a frame; a "basket" or screen mounting apparatus; one or more screens as described above and below; and basket vibrating apparatus.

It is within the scope of this invention to provide a screen as disclosed in U.S. Pat. Nos. 5,417,793; 5,417 858; and 5,417,859, but to delete the apertured plate required by these patents and to use instead a coarse mesh or a coarse flexible mesh. In certain preferred embodiments this mesh ranges in size between a 1 mesh to a 3 mesh, with a 2 mesh used in one particular embodiment. It is within the scope of this invention to use any strip, combination of strips, or pattern of strips in place of the apertured plate required by the three listed patents. It is within the scope of this invention to use any strip or strips disclosed herein in combination with the apertured plate required by the three listed patents.

The invention, in certain embodiments, discloses a screen for a vibrating separator or shaker that has increased capacity without an increase in overall dimensions. It furthermore accommodates desirable attributes such as resistance to blinding, repairability and longevity. The screen, substantially horizontal when placed on a separator for operation, is formed from one or more layers of mesh. The one or more layers of mesh are formed into an alternating series of ridges and channels lying substantially within the plane of the screen. The ridges increase the surface area of the screen without increasing the overall dimensions of the screen, thus improving flow capacity. Additionally, particles tend to drop into the channels, leaving the tops of the ridges exposed to fluids for relatively unimpeded flow through the screen that further improves flow rates. Furthermore, the ridges and channels tend to assist in evenly distributing separated particles across the screen. Uneven distribution, due to for example rolling of the screen from side to side when used on offshore platforms, degrades flow capacity of the screen.

In accordance with another aspect of the invention, the wire mesh is bonded to a rigid or semi-rigid panel having an array of openings that are very large as compared to those of the mesh. The support panel is formed with or bent into a series of alternating ridges and channels to create the ridges and channels in the wire mesh when it is bonded to the panel. The openings in the panel create, in effect, a plurality of individual screen cells when the wire mesh is bonded to the panel around each opening. When a portion of wire mesh fails or is torn within a cell, the screen is repaired by cutting the remaining mesh from the cell opening and plugging the cell opening with a solid piece of material.

In accordance with another aspect of the invention, the ridges and channels of the panel have substantially flat surfaces on which the openings are located. A substantially planar opening allows a flat plug to be inserted into the opening for improved fit and sealing. The plug is preferably formed with an edge that facilitates insertion into opening and into which the edge of the cell opening snugly fits, making a repair quick and easy.

In accordance with another aspect of the invention, the ridges have a generally triangular cross section. In a preferred embodiment, the ridges are formed from two surfaces in a triangular configuration and the channel is formed from a flat bottom surface extending between the ridges. This geometry tends to maximize effective or useful surface area of the screen, especially if flat surfaces are used on the ridge to facilitate repair. During normal operation of the separator or shaker, most of the particles fall into the channel and the material to be separated tends to flow through the screen along the sides of the ridges and the bottom of the channel. A generally triangular configuration of the ridge tends to expose greater screen area to the flow and to minimize the amount of area on top of the ridge that tends not to be exposed to material flow.

In another aspect a screen according to the present invention has a lower perforated corrugated plate with a plurality of triangular apertures or openings forming the perforations through the plate. In one aspect the triangles are congruent, of similar size, and are arrayed side-to-side across the plate. In certain aspects when a corrugated plate is used, no plastic grid is placed or used between screens or meshes or between a plate and screening material. The mesh, meshes, screen, screens, or screening material(s) are secured on the plate directly with the use of adhesive on the plate, e.g. but not limited to powder adhesive, without the use of a plastic or adhesive grid. Alternatively such a grid may be used. In certain aspects in which a corrugated perforated plate is used, the screen, e mesh or screening material does not contact a strip or multiple strips disposed beneath the plate.

In one aspect a corrugated perforated plate is secured to a frame comprised of sides. In another aspect strips as described herein are used with such a frame for certain embodiments. In such a device screening material or mesh secured to the corrugated perforated plate does not contact or bond to the strip/frame assembly.

It is, therefore, an object of at least certain preferred embodiments of the present invention to provide:

New, useful, unique, efficient, non-obvious screens, filtering screens, two- or three-dimensional screens; flat or non-flat screens; mountings for them; such screens with one or more bottom support strips or rods; such screens in which screening material is on a corrugated perforated plate which itself is on strip(s) and/or on a frame; and shale shakers with such items;

Such screens which overcome the problems, limitations and disadvantages of screens with lower apertured plates;

Such a screen with a corrugated perforated solid support plate;

Such a plate with triangular shaped perforations;

Such a screen for a shale shaker with one or more bottom support strips; such a screen also with one or more strip or rod projections for projecting above a bottom strip or apertured plate into an indentation or raised part in an upper screen layer or layers; and A shale shaker with one or more such screens.

Certain embodiments of this invention are not limited to any particular individual feature disclosed here, but include combinations of them distinguished from the prior art with their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a basis or creative impetus for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 1C is an end view of the screen of FIG. 1A.

FIG. 1D is a bottom view of the screen of FIG. 1A.

FIG. 2C is a bottom view of the screen of FIG. 2A.

FIG. 3 is a bottom view of a screen according to the present invention.

FIG. 4 is a bottom view of a screen according to the present invention.

FIG. 7A is a top view of a screen according to the present invention.

FIG. 7C is an end view of the screen of FIG. 7A.

FIG. 8A is a bottom view of part of a screen with cross strips according to the present invention.

FIG. 8B is an end view of part of the screen of FIG. 8A.

FIG. 8C is an end view of part of the screen of FIG. 8B.

FIG. 15A is a bottom view of a screen according to the present invention.

FIG. 15B is a side view of the screen of FIG. 15A.

FIG. 19 is a perspective view of a screen according to the present invention.

FIG. 20 is a side view of the screen of the FIG. 19.

FIG. 21 is a side view opposite the side of FIG. 20 of the screen of FIG. 1.

FIG. 22 is an end view of the screen of FIG. 19.

FIG. 23 is an end view of an end opposite the end of FIG. 22 of the screen of FIG. 19.

FIG. 28 is a bottom view of the screen of FIG. 26.

FIG. 29 is a side view of one side of the screen of FIG. 26.

FIG. 30 is a side view of another side of the screen of FIG. 26 opposite the side shown in FIG. 29.

FIG. 31 is an end view of the screen of FIG. 26.

FIG. 32 is another end view of the screen of FIG. 26 opposite the end shown in FIG. 31.

FIG. 35 is a side view of one side of the screen of FIG. 33.

FIG. 36 is a side view of another side of the screen of FIG. 33.

FIG. 37 is an end view of the screen of FIG. 33.

FIG. 38 is another end view of the screen of FIG. 33 opposite the end shown in FIG. 37.

FIG. 47 is an end view of the screen illustrated in FIG. 39.

FIG. 51A is a top view of a screen frame according to the present invention.

FIG. 51B is an enlargement of a portion of FIG. 51A.

FIG. 51C is an end view of a strip of the screen frame of FIG. 51A.

FIG. 52 is an alternative strip interlocking structure for a screen frame as in FIG. 51A.

FIG. 53 is an alternative strip interlocking structure for a screen frame as in FIG. 51A.

FIGS. 54 and 55 are top views of a portion of a plate.

FIG. 56 is a perspective view of a screen according to the present invention.

FIG. 57 is an enlarged portion of part of the screen of FIG. 56.

DESCRIPTION OF EMBODIMENTS
PREFERRED AT THE TIME OF FILING FOR
THIS PATENT

Figure 1A:
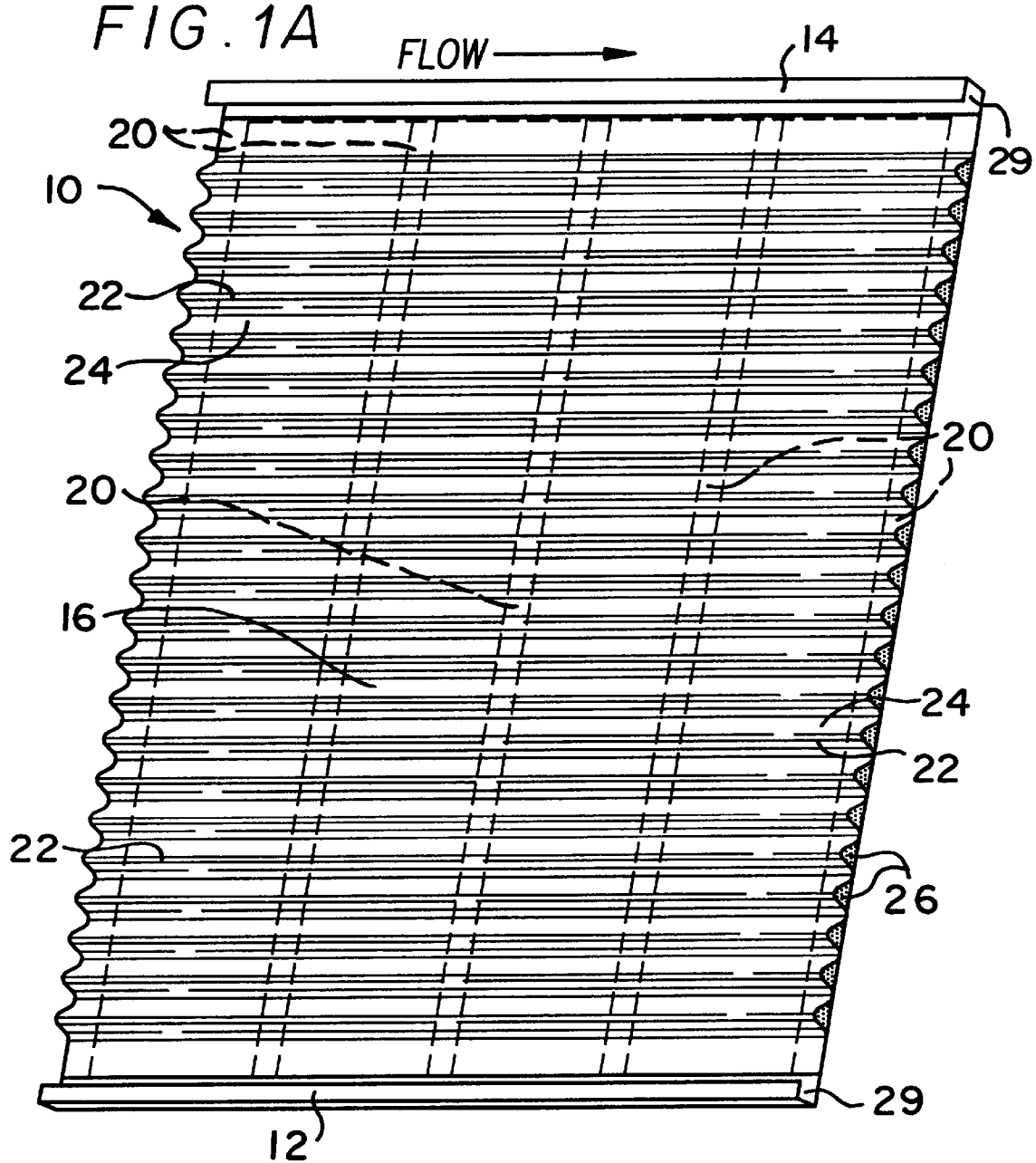
FIG. 1A is a perspective view of a screen according to the present invention.
Figure 1B:
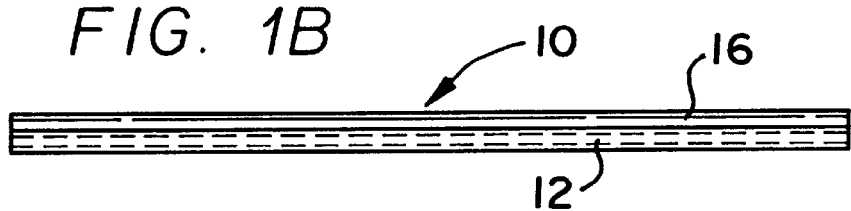
FIG. 1B is a side view of the screen of FIG. 1A.

FIG. 1A shows a screen 10 according to the present invention with a frame with two sides 12 and 14 with strips 20 extending between the two sides 12 and 14; and screen material 16 on the strips 20 and connected to the sides 12 and 14. Screen material 16 (and any other screen or screening material disclosed herein) represents any known mesh, screen, or screens, used in any combination, bonded together or unbonded. The screen material 16 as shown is "three-dimensional," i.e., not generally flat and has undulating portions with hills 22 (as seen in FIGS. 1A–1C) and valleys 24. (It is within the scope of this invention for the screening material 16 and any other screening material herein to be generally flat.)

Plugs 26 may plug ends of the hills 22. Incorporated fully herein by reference is the disclosure of co-owned pending U.S. application Ser. No. 08/282,983 filed on Jul. 29, 1994 entitled "Shale Shaker Screens" which discloses three-dimensional screens with plugged ends.

In the screen 10 each bottom part 28 of a valley 24 is glued with adhesive, e.g. but not limited to epoxy, to the cross strips 20 where the strips 20 run under the screen material 16. The frame sides 12 and 14 have, optionally, a hook portion 30 which facilitates screen mounting in certain shale shakers.

As shown in FIG. 1A the valleys 24 and hills 22 run generally parallel to the frame sides 12 and 14 and, when the screen 10 is mounted in a shale shaker, the direction of flow of drilling fluid (indicated by the arrow labelled "FLOW") is generally the same as the direction in which the valleys 24 and the hills 22 run.

Figure 2A:
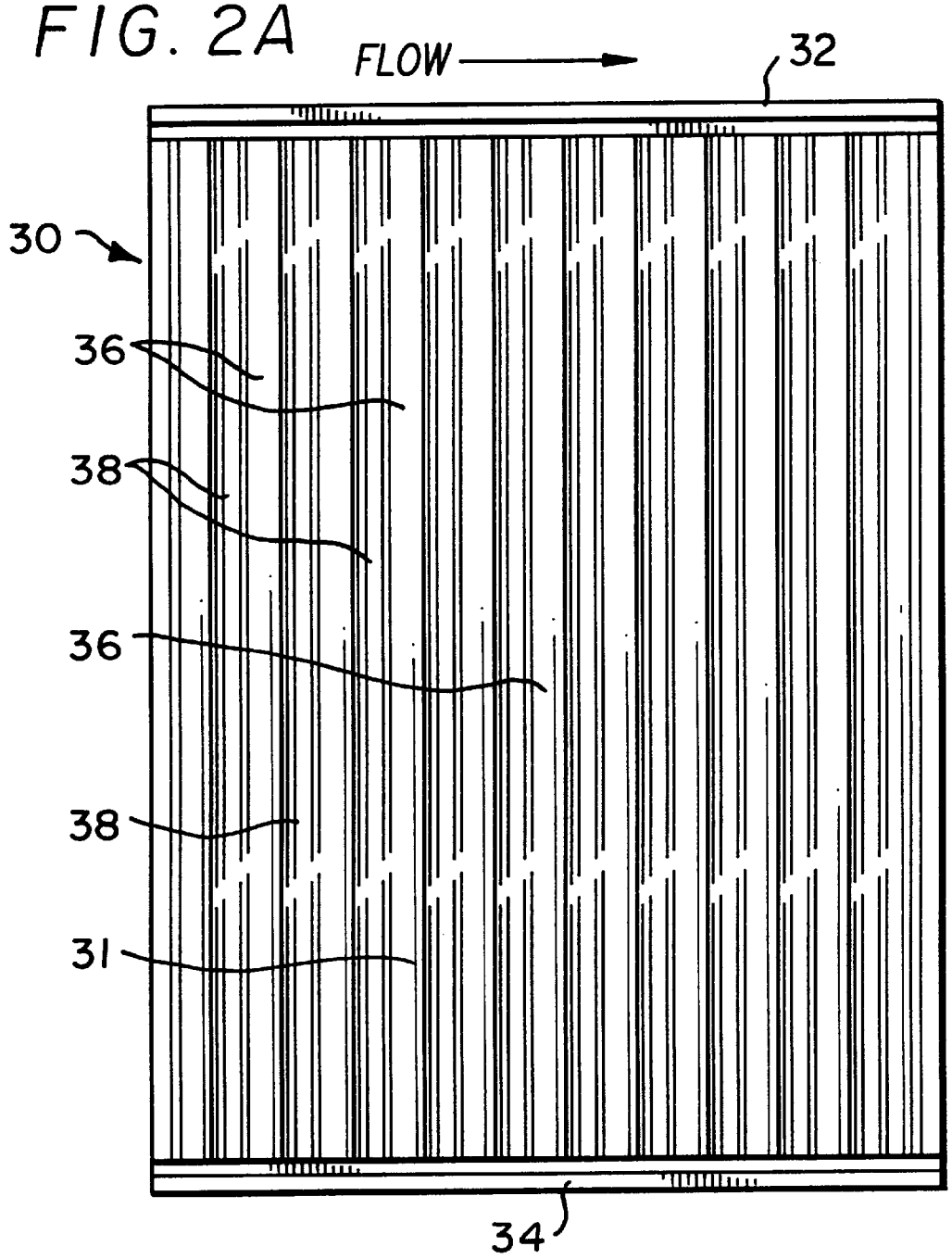
FIG. 2A is a top view of a screen according to the present invention.

FIG. 2A shows a screen 30 according to the present invention which as frame sides 32 and 34 between which is mounted undulating screen material 31. Any strip or strip combination disclosed herein may be used on the screen 30 below the screen material 31. The screen material 31 has hilltops 36 and valleys 38 which are generally perpendicular to the frame sides 32 and 34 and run across the screen 30 from one side 32 to the other side 34. When mounted on a shale shaker the direction of flow of drilling fluid across the screen 30 (as shown by the arrow labelled "FLOW") is at right angles to the general direction of the hills and valley. In one embodiment the strips are aligned with the direction of the valleys and, in another embodiment, there is a strip or rod under each valley. Instead of a strip or strips beneath the screen material 31, an apertured plate (which is not an equivalent of a rod or strip or of a series of strips) may be used.

FIGS. 3–6 show alternative configurations of bottom support strip combinations which may be used with any screen disclosed herein. The screening material may be any embodiment as disclosed herein. FIG. 3 shows an embodiment of a screen 40 with screening material 41 between frame sides 46 and 47 and a bottom support structure with cross strips 42 (like the previously described strips) and end strips 44 and 45 (which are like previously described strips but are at ends of the screening material 41).

FIG. 4 shows a screen 50 according to the present invention with screening material 51 between frame sides 52, 53, 54, and 55 and cross strips 56.

Figure 5:
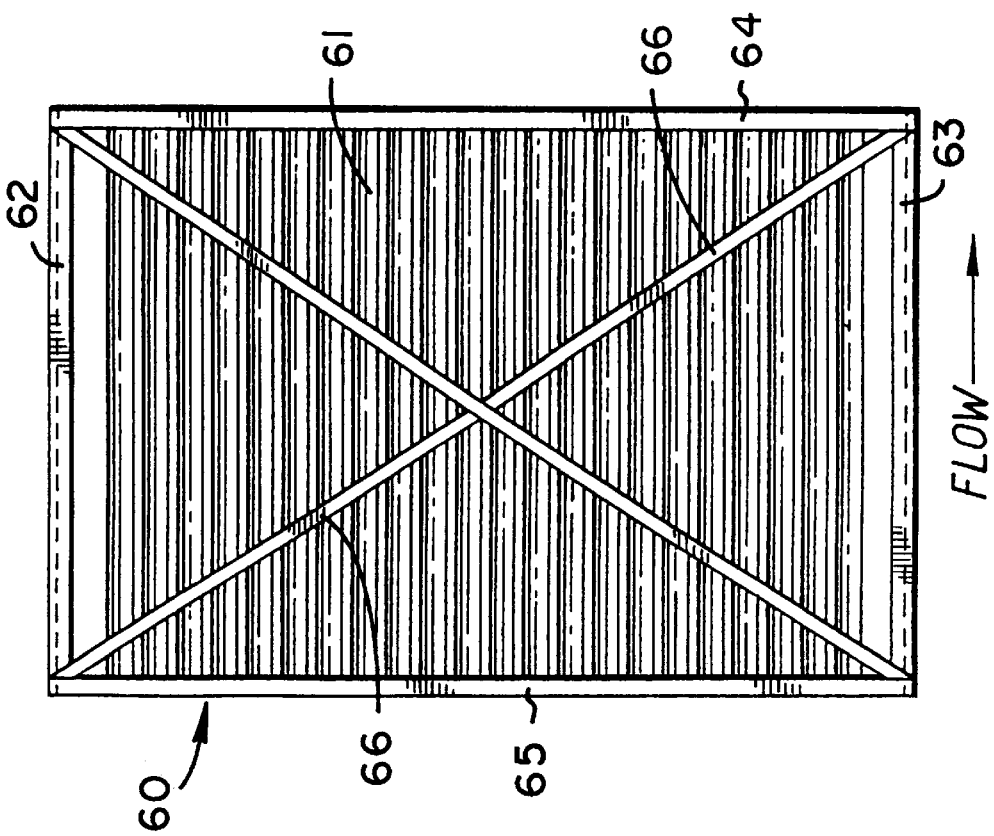
FIG. 5 is an bottom view of a screen according to the present invention.

FIG. 5 illustrates a screen 60 with screening material 61 between frame sides 62 and 63 with end strips 64 and 65 and diagonal cross strips 66. It is within the scope of this invention to use strips that are not full diagonals, but extend from any point on a first frame side to any point on a second frame side or strip which second frame side or strip is at a right angle to the first frame side.

Figure 6:
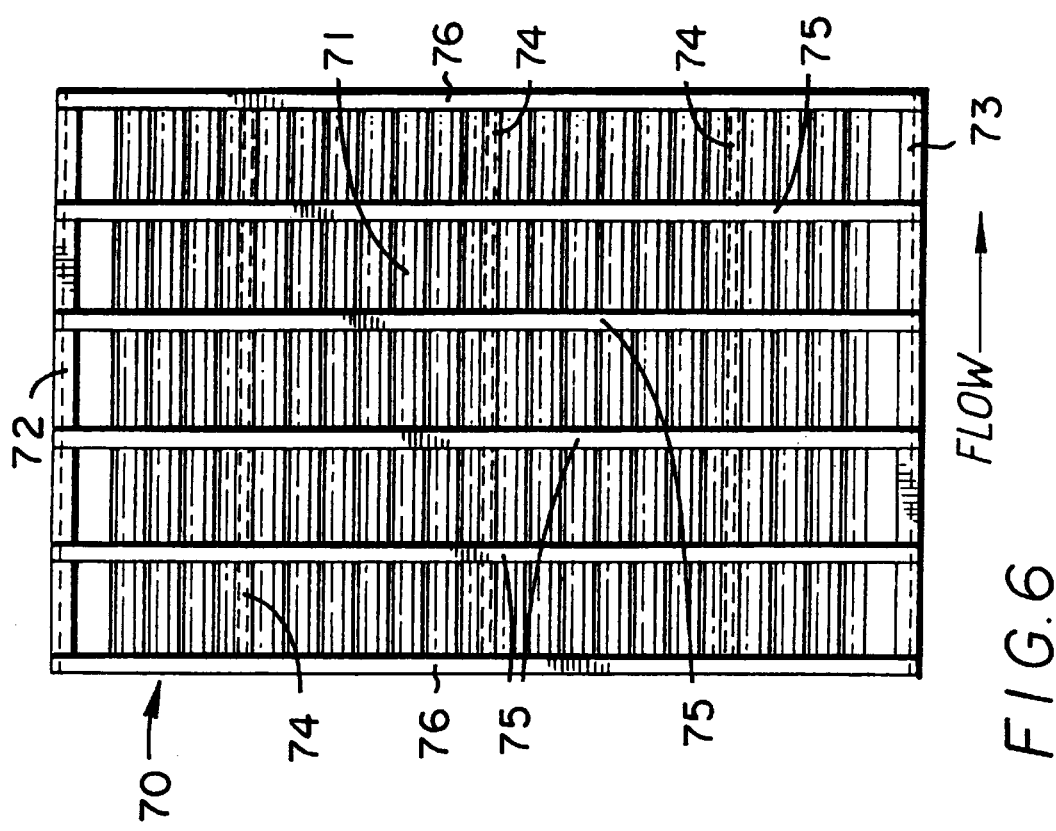
FIG. 6 is a bottom view of a screen according to the present invention.

FIG. 6 illustrates a screen 70 with screening material 71 between frame sides 72 and 73 with cross strips 74, cross strips 75 and end strips 76.

Figure 7B:
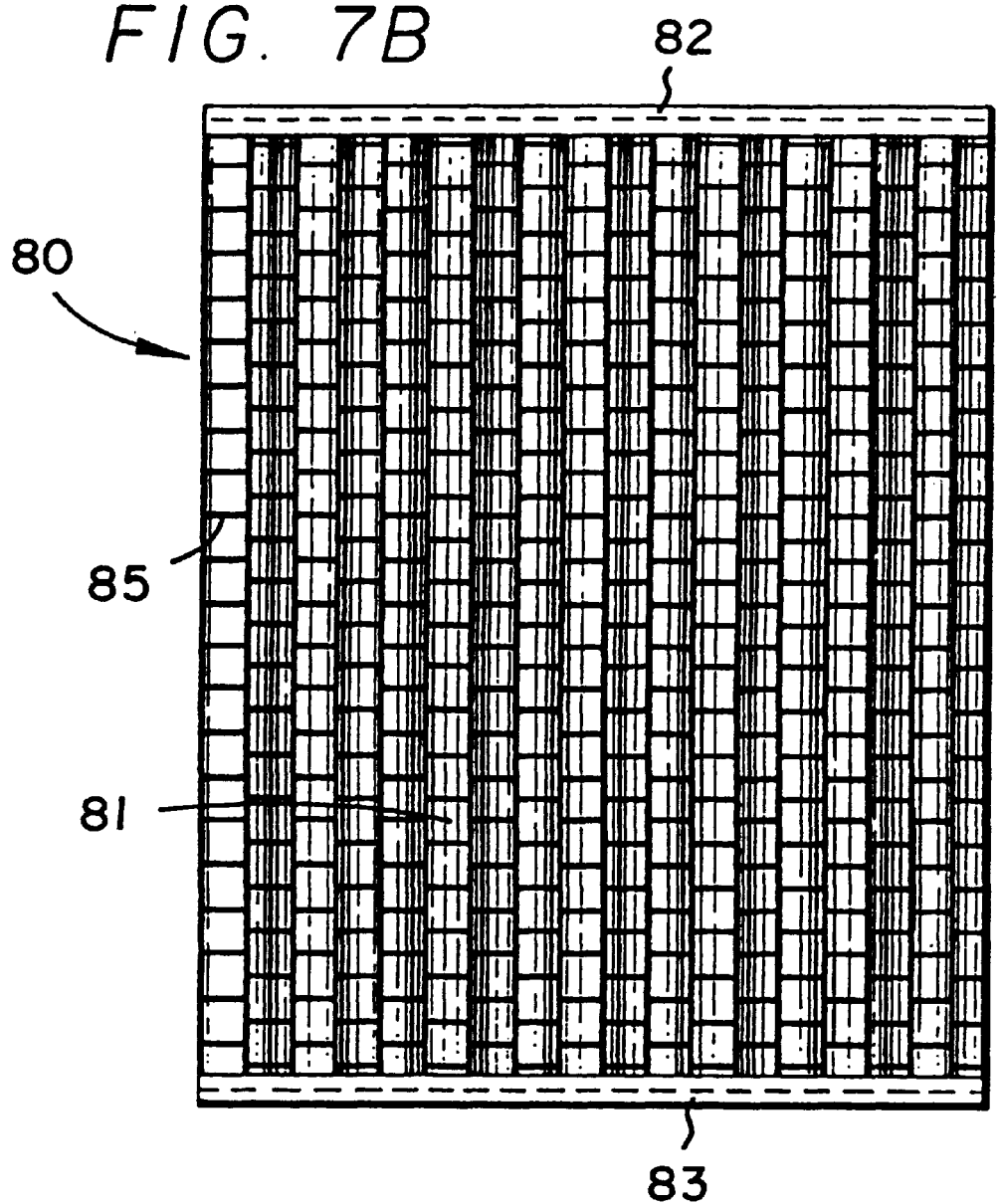
FIG. 7B is a bottom view of the screen of FIG. 7A.
Figure 7D:
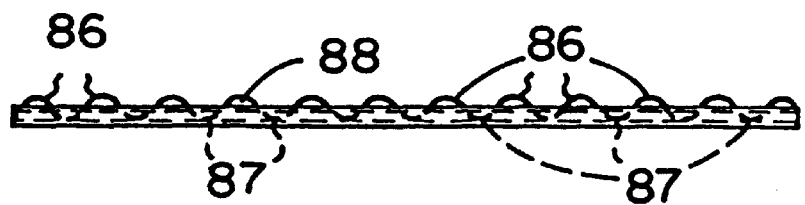
FIG. 7D is a side view of the screen of FIG. 7A.

FIG. 7A shows a screen 80 with frame sides 82 and 83 between which is secured screening material 81. The frame sides include hooks 84. A bottom support 85 is a rigid metal sheet with a plurality of openings therethrough. The screening material 81 is undulating with hilltops 86 and valleys 87. The screen 80 is emplaced in a shale shaker so that the direction of flow of drilling fluid across the screen (as shown by arrow labelled "FLOW") transverse to the general direction of the hills and valleys. A support strip or strips as disclosed herein may be used with this screen.

An opening 88 at the end of each undulating section of the screening material 81 may be closed off by initially applying an excess of screening material 81 so that a portion thereof extends beyond what will be the final outer boundary of the screening material. The excess portion is cut, folded back over the opening to close it off, and then secured in place with adhesive or welding.

FIG. 8A shows a bottom strip support assembly 90 for a screen according to the present invention. A plurality of strips 91 extend between and are secured to frame sides 92 and 93. as shown in FIG. 8B, a strip 91 is welded along a line 94 to a part of a screen hook 95. The weld is sized and configured to prevent leakage at the hook/strip interface. A sleeve 96 made of galvanized metal encases the hook for added strength and protection.

In certain embodiments of a screen as in FIG. 8A, the strips 91 are between one-thirty second and one-eighth inches thick and about forty-five and a half inches long; the frame sides 92, 93 are about thirty six inches long; the strips 91 are made from galvanized steel; the frame sides 92, 93 are made from 20 gauge galvanized steel; and the sleeve 96 is made from galvanized steel.

Figure 9:
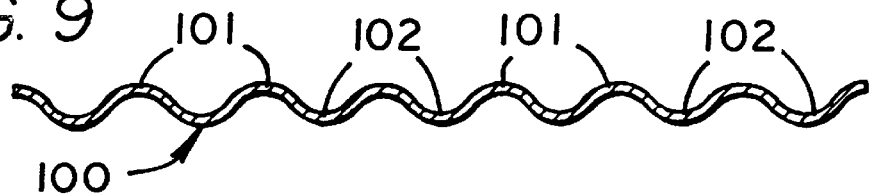
FIG. 9 is an end cross-sectional view of a strip for use in the present invention.

FIG. 9 illustrates a screen support strip 100 with hilltops 101 and valleys 102 for corresponding to similar hills and valleys in a screen or screening material to which the strip is applied.

Figure 10:
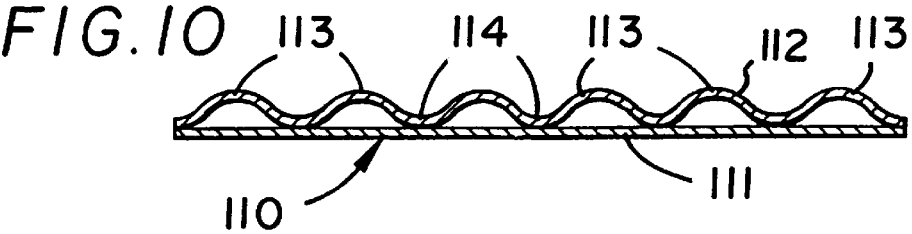
FIG. 10 is an end cross-sectional view of a strip for use in the present invention.

FIG. 10 illustrates a screen support strip 110 according to the present invention which has a bottom flat strip 111 and an undulating strip 112 fixed to the bottom flat strip 111. The undulating strip 112 has hilltops 113 and valleys 114 for corresponding to a screen or screening material with similar hills and valleys.

Figure 11:
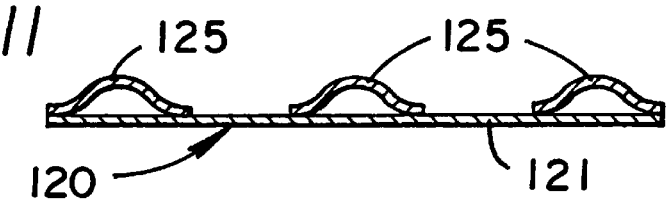
FIG. 11 is an end cross-sectional view of a strip for use in the present invention.

FIG. 11 illustrates a screen support strip 120 like the screen support strip 110, but with fewer projecting portions 125 so that when a screen with multiple troughs or indentations is supported by the strip 120, only every other trough or indentation in the screen (or screening material) will have a projecting portion 125 therein. It is within the scope of this invention to select any particular trough, plurality of troughs, or pattern of troughs or indentations to have a projection support portion therein. The screen support 120 has a lower strip 121 and the upper projecting portions 125, which may also be strips.

Figure 12:
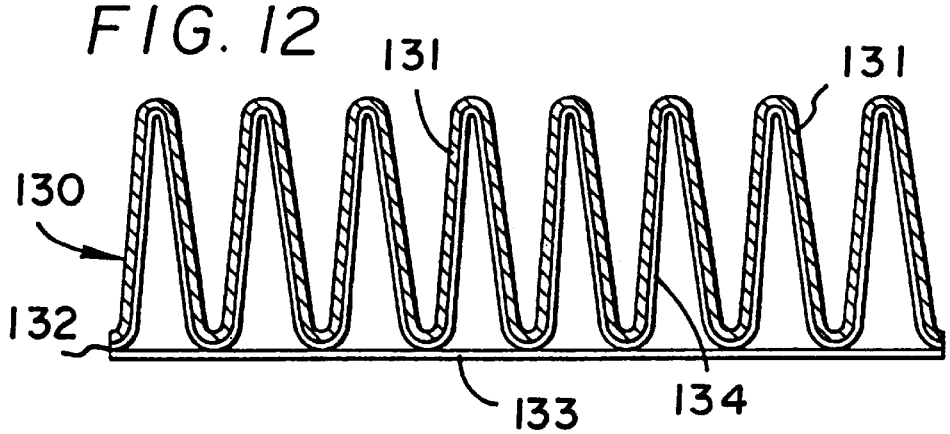
FIG. 12 is an end view of a screen according to the present invention.

FIG. 12 illustrates a screen 130 according to the present invention with screening material 131 (which may be any screen or screening material disclosed herein) supported by a support strip 132. The support strip 132 has a bottom strip 133 and an undulating strip 134 secured thereto. The screening material 131 may rest on the undulating strip 134 or some or all of the undulating strip 134 may be bonded to the screening material.

Figure 13:
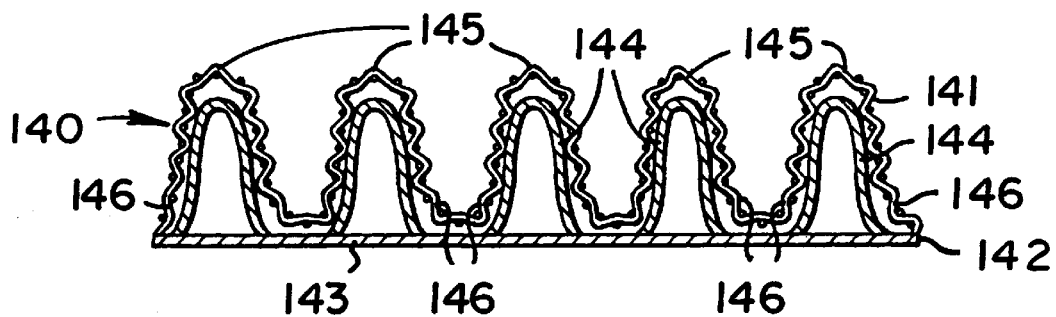
FIG. 13 is an end view of a screen according to the present invention.

FIG. 13 illustrates a screen 140 according to the present invention which has screening material 141 (which may be any screen or screening material disclosed herein) supported by a support strip 142. The support strip 142 has a lower strip 143 and projecting strip portions 144 secured to the lower strip 143. The projecting strip portions 144 project up into hills formed in the screening material 141. In any embodiment of this invention in which part of a support strip projects up into a raised part of a screen, the projecting strip may be connected to, adhesively bonded to, or welded to the screen at any selected point, line, points, or lines in the raised screen part. As shown in FIG. 13, the projecting strip portions are not bonded to, connected to or welded to the tops 145 of screening material 141; nor are they bonded to, welded to, or connected to lower portions 146 of the raised parts of the screening material 141. Alternatively the projecting strip portions 144 may be bonded to, connected to, or welded to only the tops 145 of the raised parts of the screening material; and/or to the lower portions 146.

Figure 14:
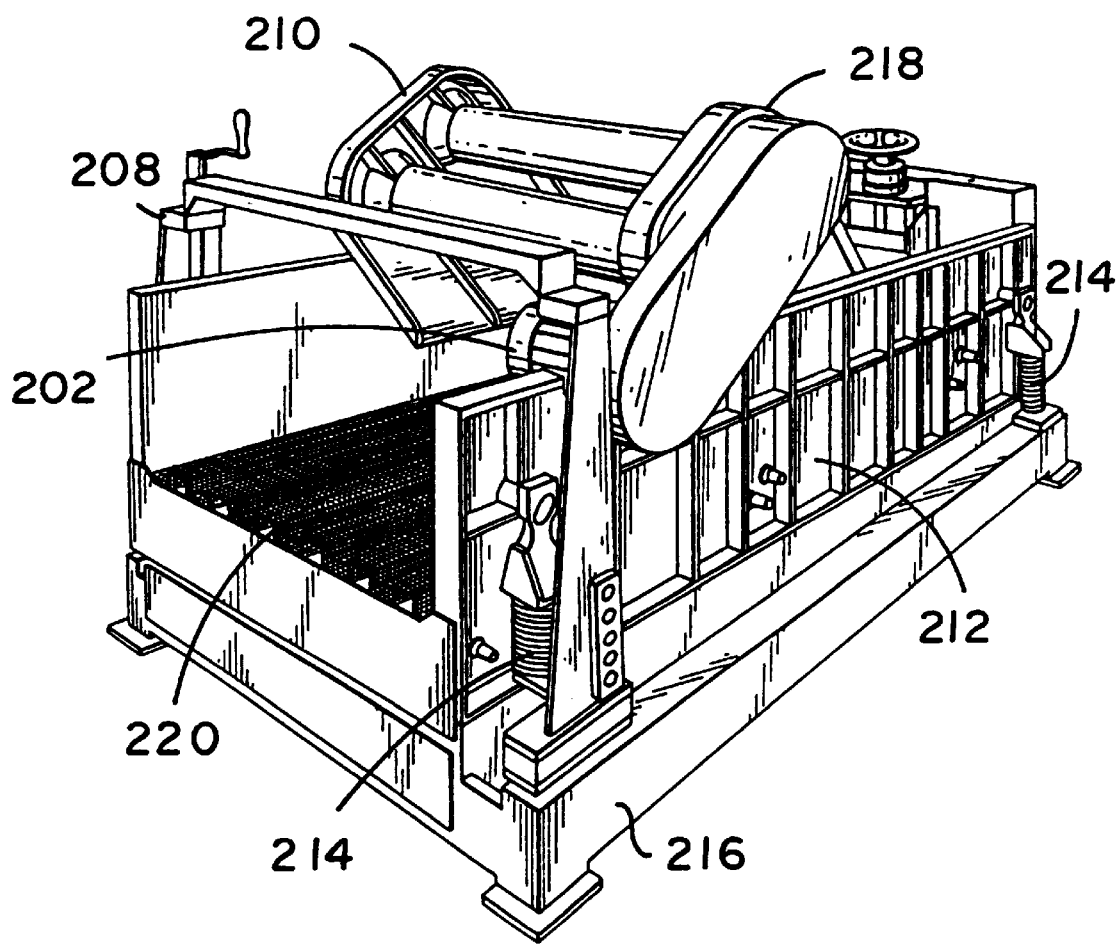
FIG. 14 is a perspective view of a shale shaker according to the present invention.

Referring now to FIG. 14, a shale shaker 210 according to the present invention has a screen 220 (with screen or screening cloth or mesh as desired) according to the present invention mounted on vibratable screen mounting apparatus or "basket" 212. The screen 220 may be any screen disclosed herein or have nay combination of any feature or features of any screen or screen part disclosed herein; and any such screen may be used with any appropriate shaker or screening apparatus. The basket 212 is mounted on springs 214 (only two shown; two as shown are on the opposite side) which are supported from a frame 216. The basket 212 is vibrated by a motor 202 and interconnected vibrating apparatus 218 which is mounted on the basket 212 for vibrating the basket and the screens. Elevator apparatus 208 provides for raising and lowering of the basket end. The screen 220 may be any screen disclosed herein.

FIG. 15A shows a screen 250 like the screen in FIG. 1D, but without any frame sides. The screen 250 has a plurality of bottom support strips 252, each of which has two upper in-turned edges formed into a mounting hook 254. Undulating screening material 256 is bonded to the strips 252.

Figure 16A:
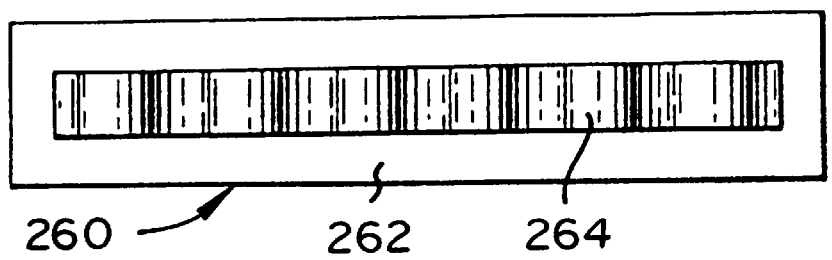
FIG. 16A is a top view of a support strip according to the present invention.
Figure 16B:
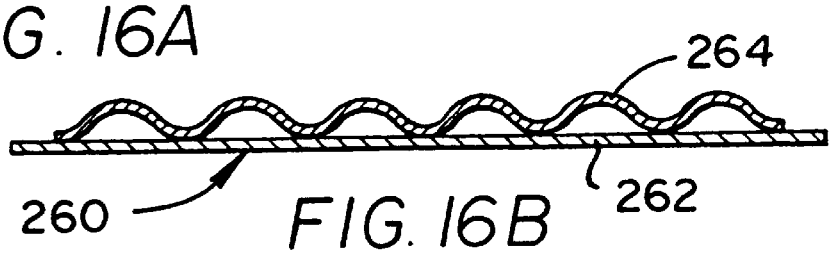
FIG. 16B is a side view of the support strip of FIG. 16A.

FIG. 16A shows a support strip 260 according to the present invention, with an upper projecting strip 264 secured to a lower strip 262. The upper projecting strip 264 is narrower in width than the lower strip 262. Any of the previously described strips with a projecting upper strip and a lower strip may have an upper strip that is narrower in width than the lower strip.

Figure 17A:
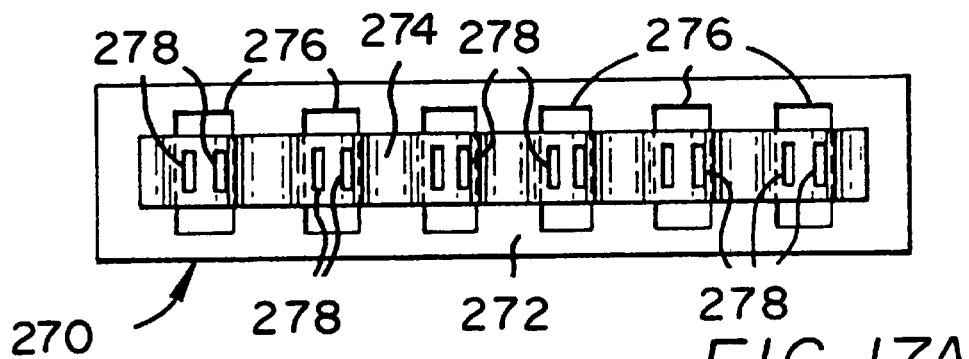
FIG. 17A is a top view of a support strip according to the present invention.
Figure 17B:
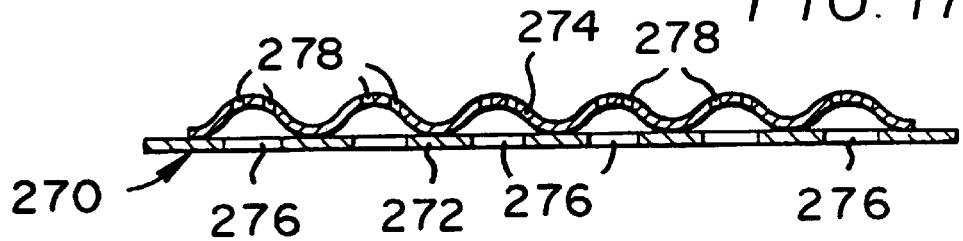
FIG. 17B is a side view of the support strip of FIG. 17A.

FIG. 17A discloses a support strip 270 with a lower strip 272 and an upper strip 274 secured to the lower strip 272. A series of openings 276 is provided through the lower strip 272 to facilitate fluid flow. A series of openings 278 is provided through the upper strip 274. Any strip or rod disclosed herein may have, in certain embodiments, holes therethrough to promote fluid flow. Any strip or rod disclosed herein with an upper projecting portion and a lower strip or rod may have holes in the upper strip or rod, the lower strip or rod, or both to promote fluid flow.

Figure 18:
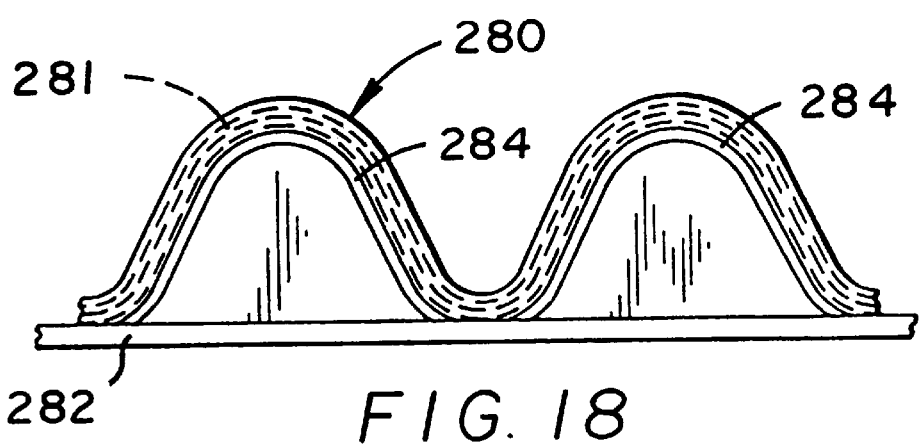
FIG. 18 is a side view of a screen according to the present invention.
Figure 24:
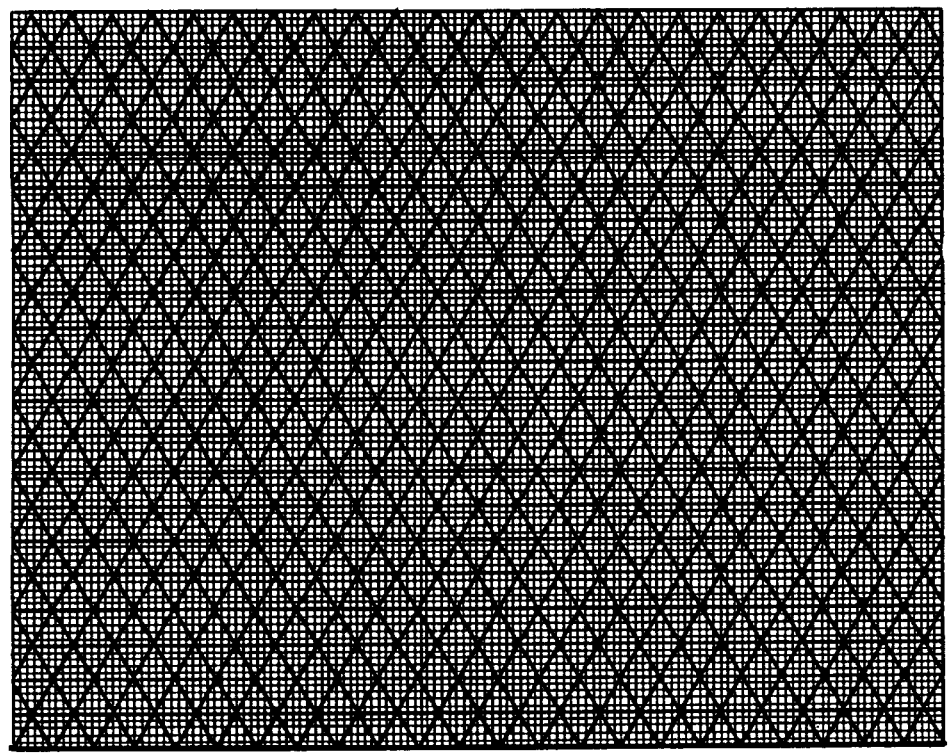
FIG. 24 is a top view of the screen of FIG. 19.
Figure 25:
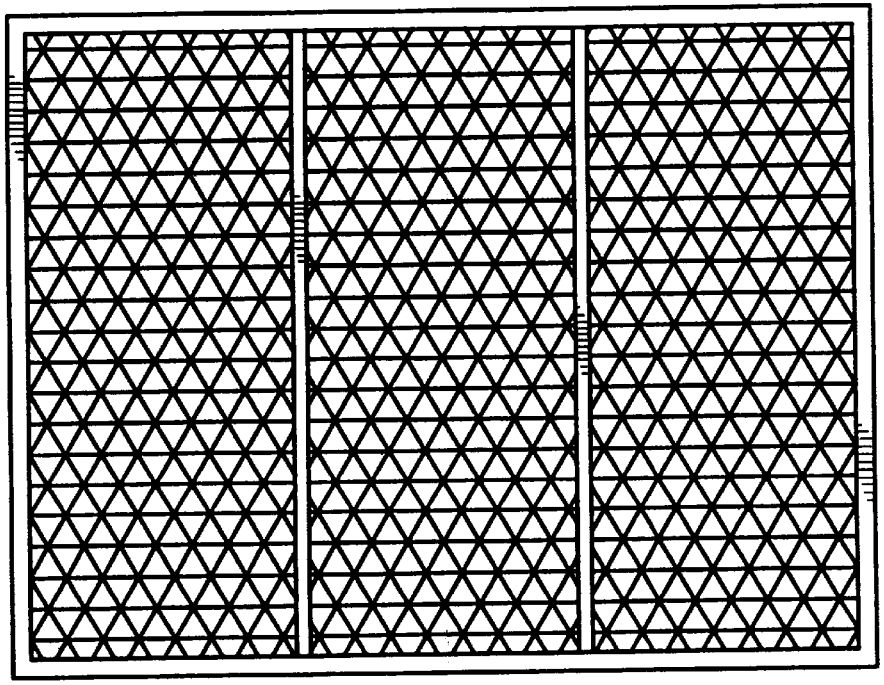
FIG. 25 is a bottom view of a screen according to the present invention.
Figure 26:
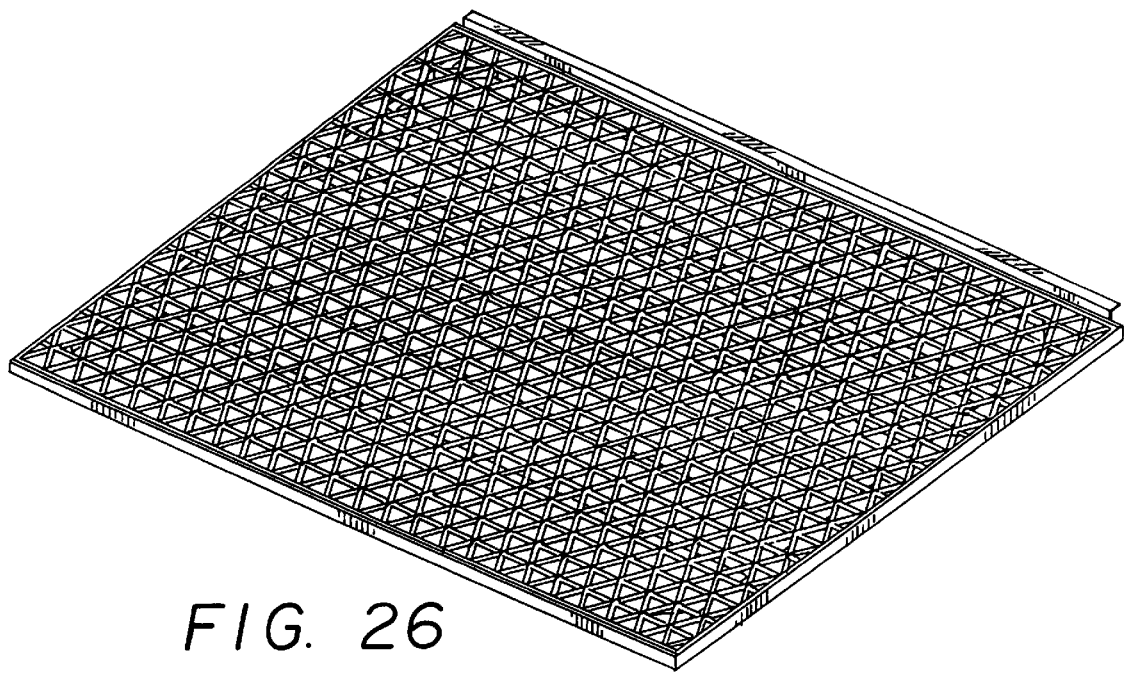
FIG. 26 is a perspective view of a screen according to the present invention.
Figure 27:
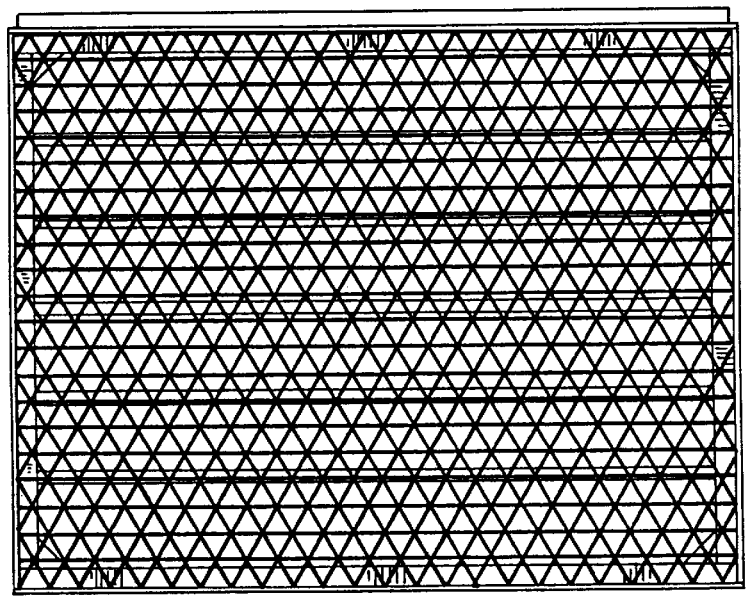
FIG. 27 is a top view of the screen of FIG. 26.
Figure 33:
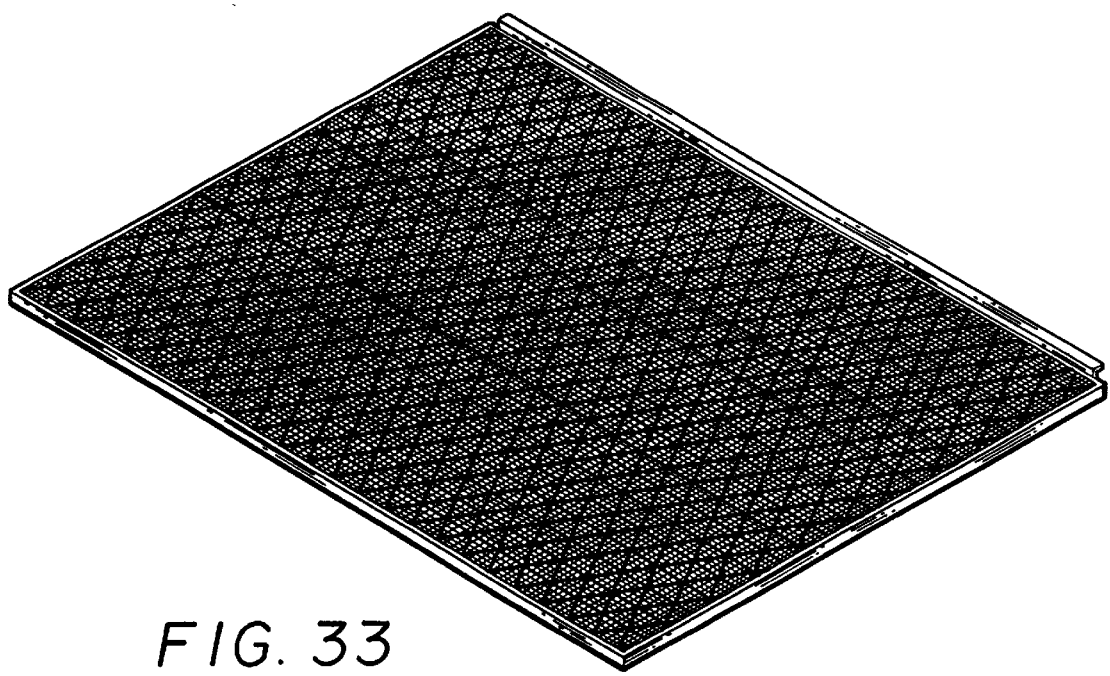
FIG. 33 is a perspective view of a screen according to the present invention.
Figure 34:
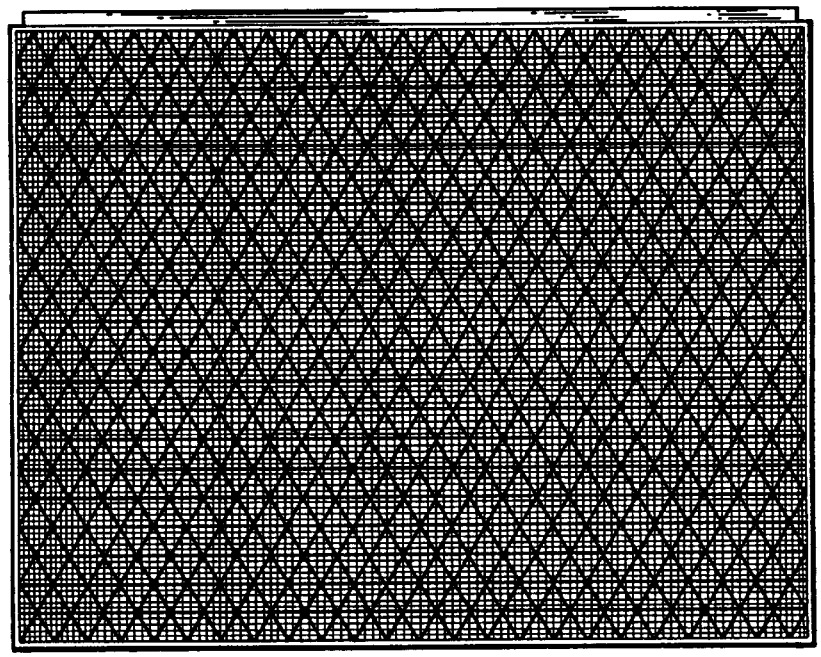
FIG. 34 is a top view of the screen of FIG. 33.

FIG. 18 discloses an improvement to screens with upper screening material and a lower rigid perforated metal sheet or apertured plate, including but not limited to improvements for screens as disclosed in U.S. Pat. Nos. 5,417,793; 5,417,858; and 5,417,859. A screen 280 with screening material 281 has a lower apertured plate 282 (as disclosed, e.g., in the three listed patents). Upper projecting strips 284 are secured to the lower apertured plate 282. The upper projecting strips 284 may or may not be bonded to the screening material 281 and may or may not have holes therethrough. The screening material may be bonded to itself, and/or to any apertured plate, strip, or rod. Any upper projecting rod, strip, combination of strips or rods, or pattern of strips or rods disclosed herein may be used with screens with a lower apertured plate, including but not limited to those disclosed in the three listed patents.

FIGS. 19–38 present various screen designs according to the present invention and various views thereof.

Figure 39:
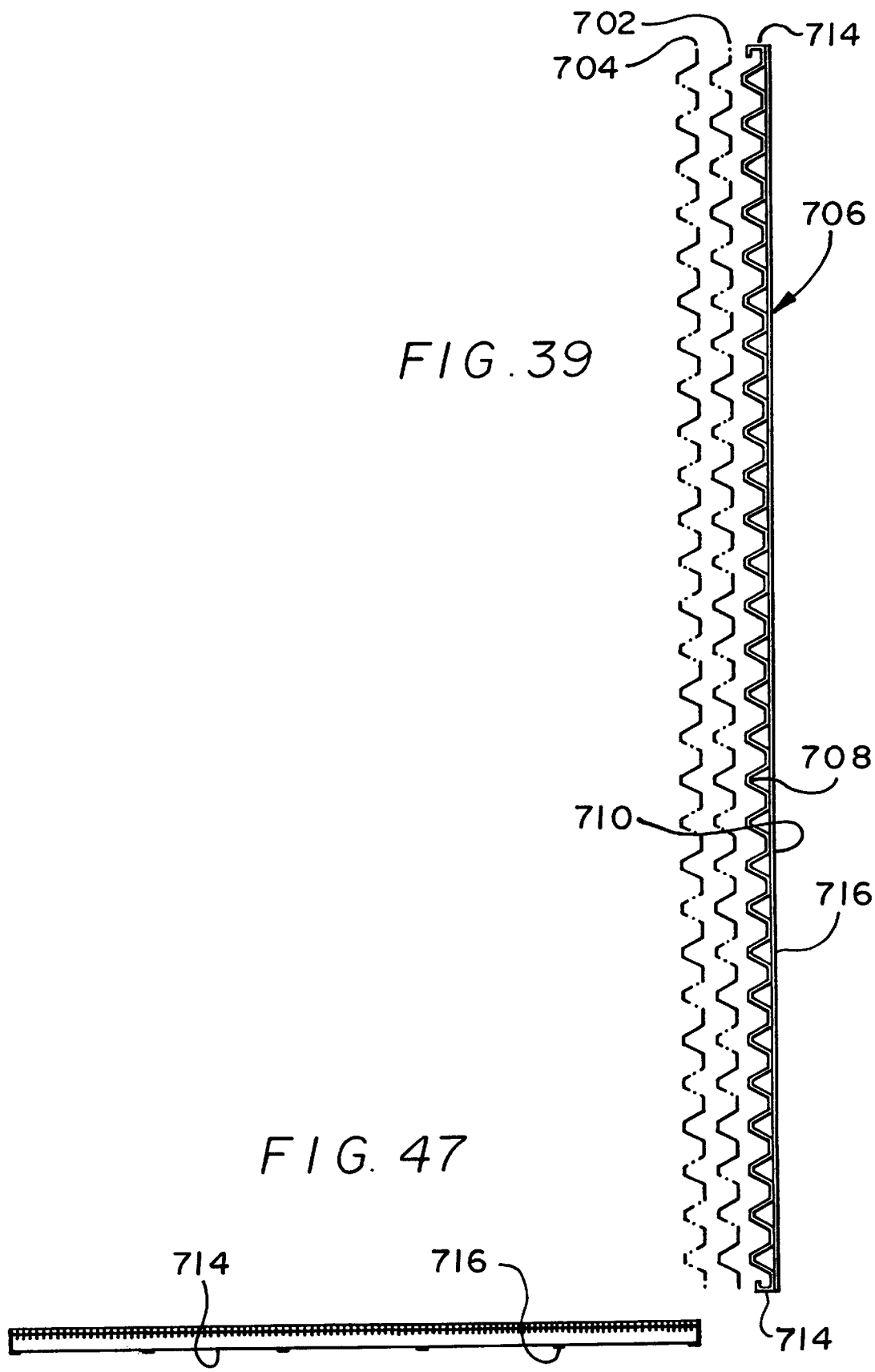
FIG. 39 is an end view of a screen according to the present invention.
Figure 40:
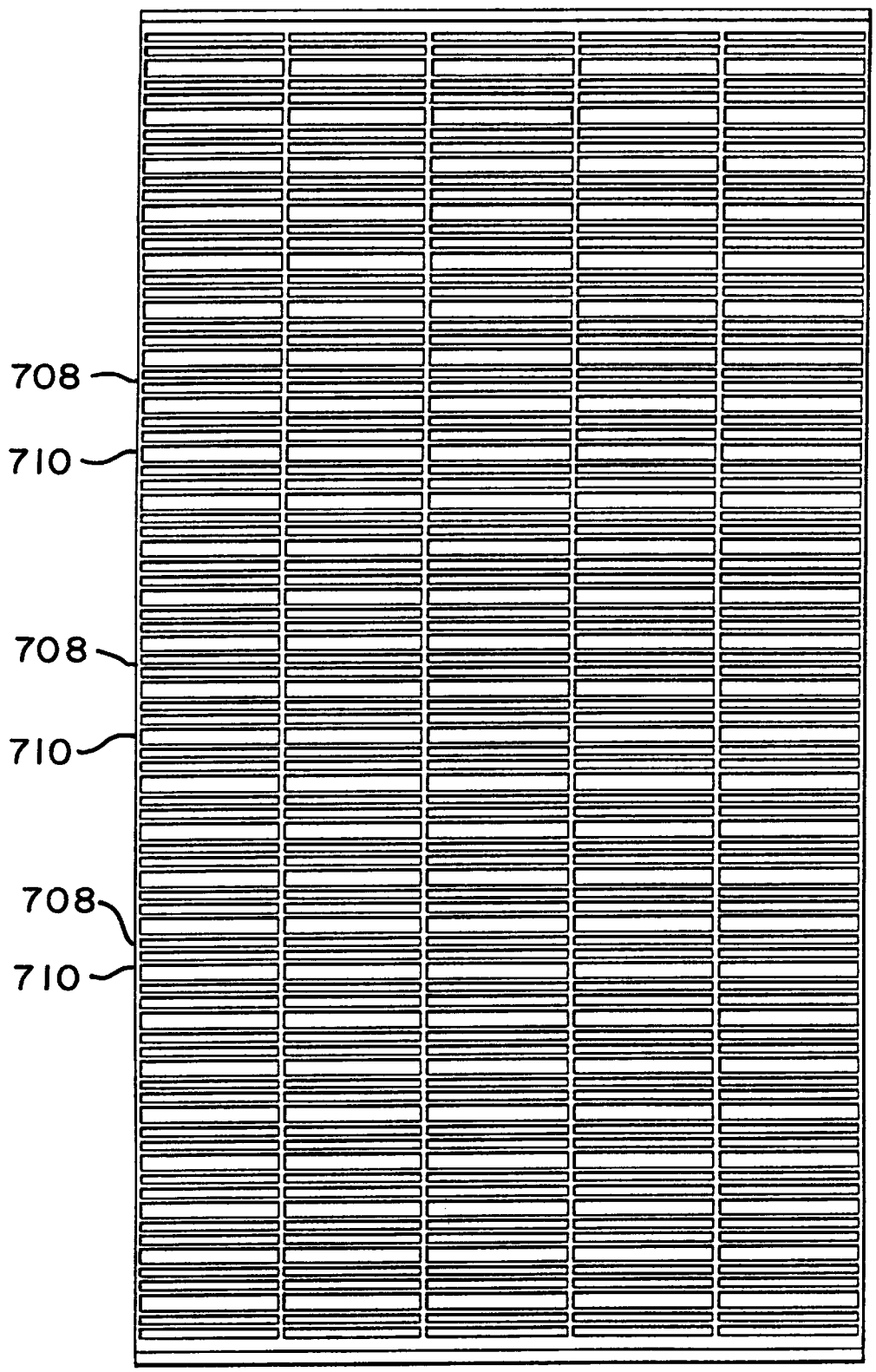
FIG. 40 is a plan view of the screen of FIG. 39.

In the following description, like numbers refer to like parts. Referring to FIGS. 39, 40, and 47 vibrating screen 700 includes a first layer 702 of wire mesh web and a second layer 704 of wire mesh web. Preferably, the first mesh layer is made from a web of bolting cloth grade wire mesh. The second mesh layer is a backing mesh. The first and the second mesh layers are supported on frame 706. The frame is formed to create a plurality of ridges 708 running the length of the screen 700, defining therebetween a plurality of channels 710. Channels run the length of the screen 700 from the back end of the screen to its front end 712. Attached to each side of the screen are hook straps 714. Each hook strap is bonded to the frame 708 and mesh layers 702. Steel straps 716 laterally tension the first and second mesh layers to maintain in the surface of the screen the channels and ridges.

The screen is secured to a shaker in a well known manner by hooking around the hookstraps and tightening rails disposed along the edges of the basket of a shaker (not shown). A series of stringers below the screen (not shown) cause the screen to bow as the rails pivot downwardly as they are tightened.

During operation, material containing solids to be separated is poured onto the back of the screen. Solids tend to collect in the channels and move toward the front end of the screen when the screen is vibrated. Fluid and particles smaller than the openings in the layer of mesh flow through the mesh along the sides of ridges 708 and the bottoms of channels 710.

Figure 41:
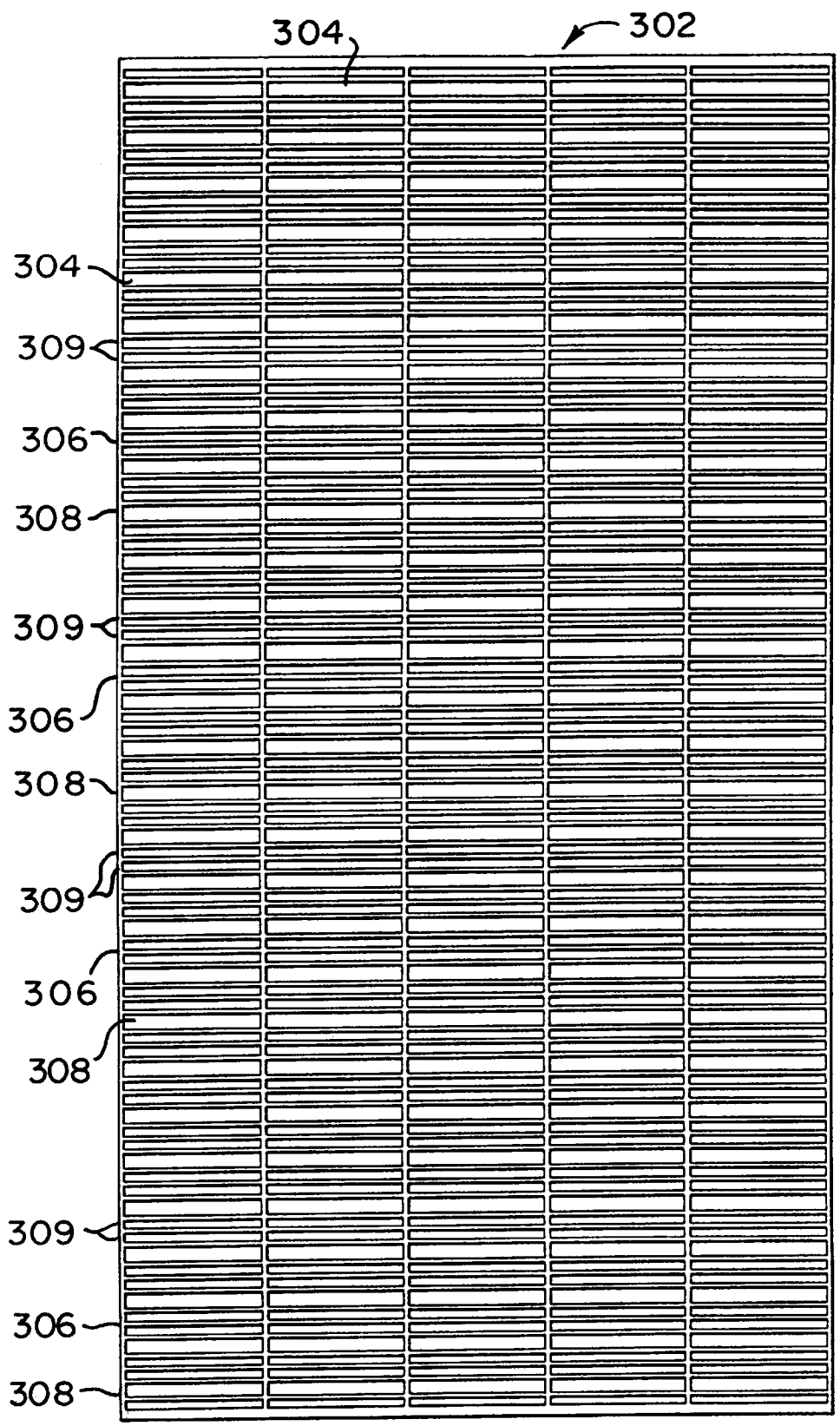
FIG. 41 is a plan view of an alternate embodiment of a screen according to the present invention.
Figure 42:
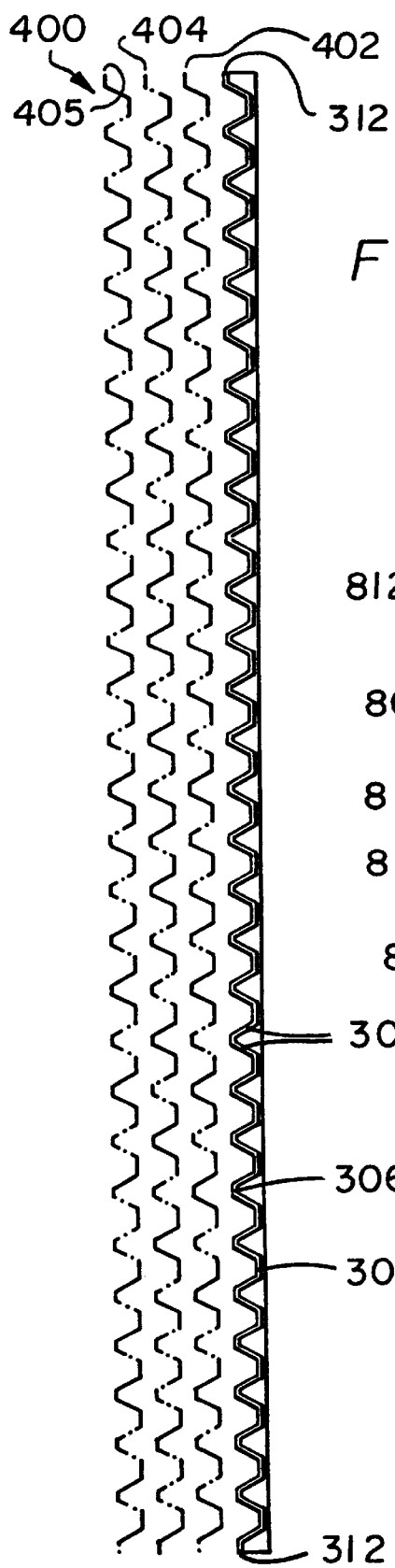
FIG. 42 is an end view of the screen of FIG. 41.

Referring now to FIGS. 41 and 42, in an alternate embodiment of screen 100, a first layer of wire mesh 402, a second layer of wire mesh 404 and a third layer of wire mesh 405 (the wire meshes are shown only in FIG. 42 exploded away from panel 302) are bonded to panel 302 to form screen 400. The first and second layers are a bolting cloth grade wire mesh. The third layer 405 is a mill grade or market grade wire mesh supporting the first and second layers. The panel is formed from a sheet of metal by punching or cutting an array of elongated, rectangular openings 304 into the sheet of metal according to a predetermined pattern. The openings have uniform size and shape. The sheet is then bent with a press or rolled into a corrugated configuration substantially as shown in FIG. 42. The corrugated configuration is comprised of alternating series of triangular shaped ridges 306 and flat bottom channels 308. Each triangular ridge 308 has two substantially flat side surfaces separated by a narrow peak 309.

Along each end of the panel is bonded a frame 310. Frame 310 is contoured to fit and provide support for the ridges 306. The screen is formed so that its side edges run along the peak of a ridge 306. Terminating the sides of the screen along a ridge helps to prevent material from falling between the screen and the inside wall of a shaker basket (not shown) over which the screen is placed.

Although other ridge geometries having flat surfaces may be used, the triangular configuration of the ridges and the flat bottom of the channels tend to maximize effective flat surface area for placement of the openings 304. Each opening 304 is located on a flat surface of either a side of a ridge or a bottom surface of a channel. The rectangular shape of the openings allow as much of the flat surface to be cut with openings allow as much of the flat surface to be cut with openings as is possible while leaving enough solid area to remain to form a grid or lattice-like structure that will retain its shape and not break during normal use.

Once the panel is formed, the first layer 402, the second layer 404 and third layer 405 of wire mesh are heated and then bonded to the panel. The heating expands the wire mesh. After the wire mesh is bonded to the panel, it cools and contracts, thus tensioning the wire mesh. Tensioning helps to maintain uniformity of the wire mesh and to keep the first and second layers of wire mesh together during operation, thus giving the screen a finer cutting point. Tensioning the wire mesh also assists in conveying particles to the end of the screen. A slack screen will not convey particles as well, especially when heavily loaded.

Figure 43:
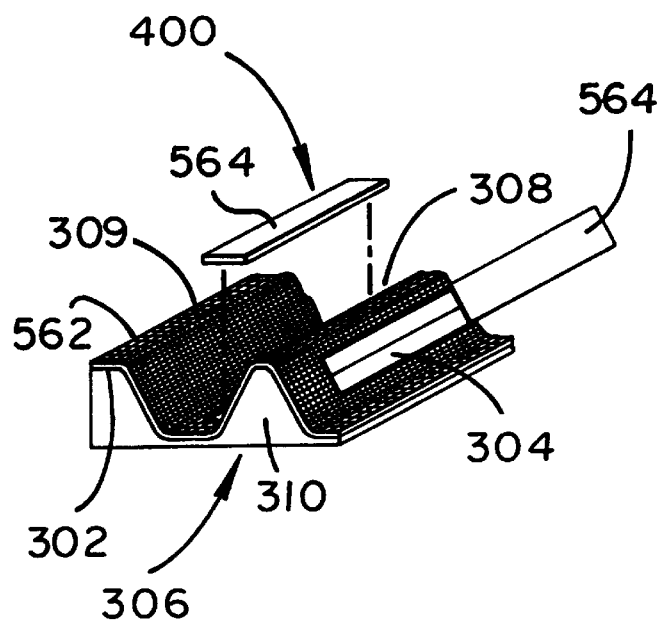
FIG. 43 is a perspective view of a portion of a screen like that of FIGS. 41 and 42.

Referring now to FIG. 43, a perspective view of a portion of a screen 400 shows a layer of wire mesh 562, which includes wire mesh webs 402, 404 and 405 (FIG. 42) bonded to panel 302. Should a tear develop in wire mesh layer 562, the wire mesh surrounding the tear is cut from around the opening 304 in which the tear occurs. A plug 564 is then inserted into the opening in the screen to seal the screen.

Figure 44:
FIG. 44 is a top plan view of a plug for repairing the screen of FIG. 43.
Figure 45:
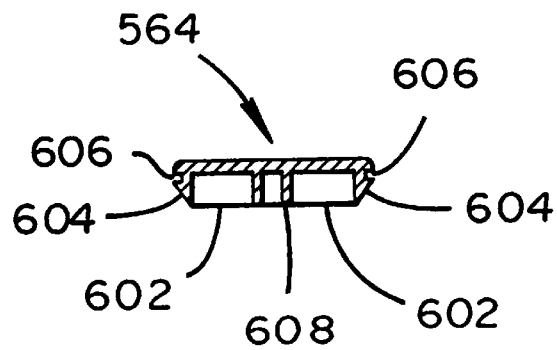
FIG. 45 is a cross-section of the plug of FIG. 44, taken a long section line 45—45.

Referring now to FIG. 44 and 45, plug 564 is made of an elastic rubber or similar elastomeric material. Its width and length are very slightly larger than one of the openings 304. It has a flat top section surrounded on all sides by a skirt-like side edge 602. The side edge is adapted for enabling the plug to be manually inserted into one of the openings 304 and to seal securely against the side of the opening. The side edges have an outwardly tapering bottom section 604 and a channel 606. The tapering bottom section is sufficiently flexible enough to deflect inwardly under force of the edges of the opening when the plug is pushed into the opening. Deflection of the bottom of the sides pulls inwardly a lower edge of channel 606, thereby providing sufficient clearance to push the plug further down into an opening 304 to the point the upper edge of the channel engages the upper edge of the opening. The width of channel 606 is slightly larger than the thickness of the edge of an opening 304 (which includes the thickness of the panel and two layers of wire mesh). Therefore, the bottom tapering section 604 springs back, locking the plug into place and sealing it against the edges of the opening. Support ribs 608 provide lateral strength to the plug so that it does not deflect downward when loaded during operation, in a manner that would pull the top edge of the channel away from the edge of the opening and allow the load to force the plug through the bottom of the opening.

Figure 46:
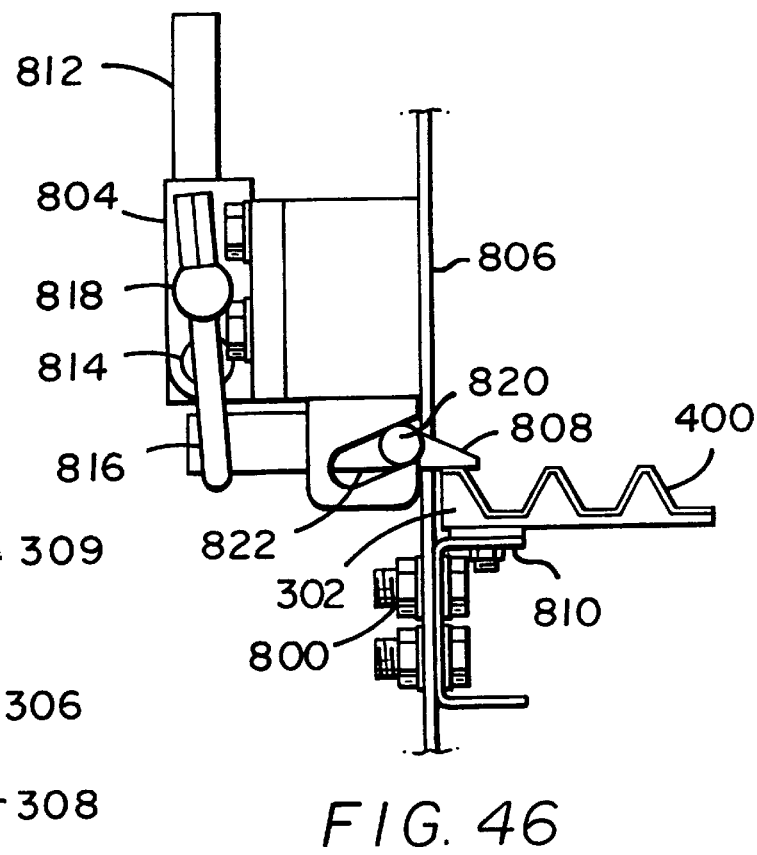
FIG. 46 is an end view of a portion of an end view screen like that of FIG. 43 mounted to basket of a shaker, showing a latching mechanism for securing the screen to the shaker.

Referring to FIG. 46, the screen 400 is secured to a basket of a shaker (not shown) using cam latch 804. Latch 804 is secured to side wall 806 of the basket 802. A latching end of latching bar 808 extends through an opening in the wall to engage the top of screen and to force the screen against bracket 810. Handle 812 pivots about pin 814. U-bolt 816 is connected through rod 818. Rod 818 extends through handle 812. The other end of the U-bolt (not seen) is connected in a similar fashion to the other end of the rod so that the U-bolt is permitted to swing about rod 818 under the handle 812. When handle 812 is pivoted upwardly, the saddle of the U-bolt lifts up on latching bar 808, causing the latching bar to pivot about pin 820 and press against the screen. Pulling down on handle 812 lowers the saddle of U-bolt 816, permitting the latching bar to pivot counter-clockwise and release the screen. To assist in quickly replacing the screen, slot 822 allows pin 820 to be moved back and thus allows the latching member 808 to be pulled behind the side of the basket.

Figure 48:
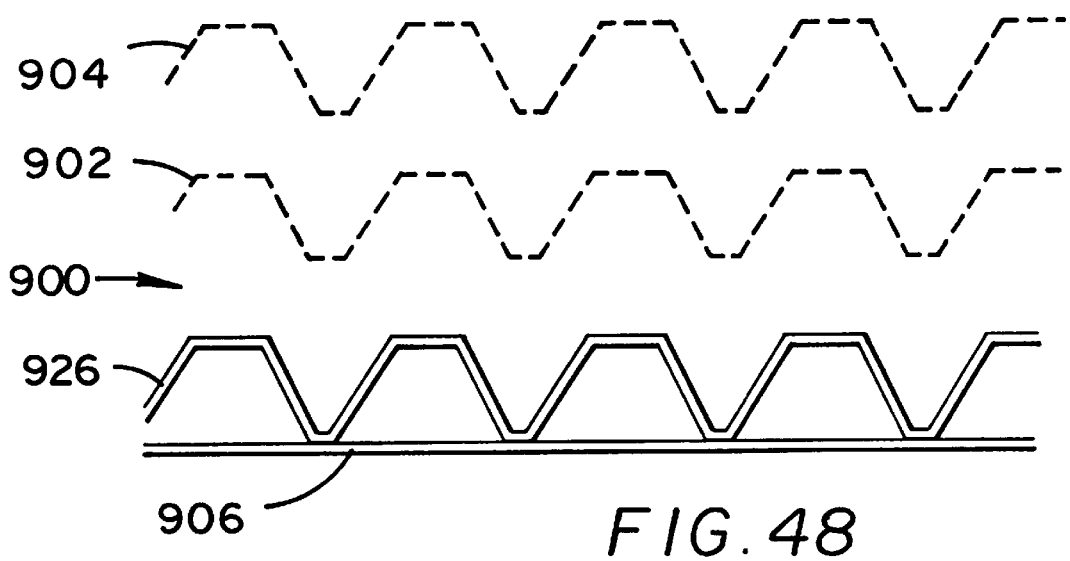
FIGS. 48 and 49 are end views of screens.

FIG. 48 shows a screen 900 like the screen 700 (FIGS. 39, 40) with a similar length and width (see FIG. 40), but with a somewhat different screen shape as viewed from the end (e.g. as in FIG. 39). The screen 900 has a first layer of wire mesh 902 and a second layer of wire mesh web 904 (shown apart from the frame prior to final assembly after which the meshes are on the frame. It is within the scope of this invention to use only one screening layer for any screen described herein or to use three or more layers. A frame 906 (like the frame of the screen 700) supports the mesh and/or screening layers. In one aspect the layers shown for the screen rest one on top of the other and in another aspect one or more or all of the layers are bonded together and in another aspect they are bonded to the frame across their entire surfaces or only around the periphery thereof. The frame 906 is configured and shaped to correspond to the corrugated shape or undulating shape of the layer(s) above it; alternatively the layer(s) may be made to correspond to the shape of the frame (as viewed on end as in FIG. 39). Ridges 908 have relatively elongated flat tops as compared to the length of the flat tops of the ridges of the screen 700 and flat valleys 912 of the frame 906 are relatively short as compared to the valleys of the screen 700. It is within the scope of this invention for the ridges and valleys to have any desired width or shape.

Figure 2B:
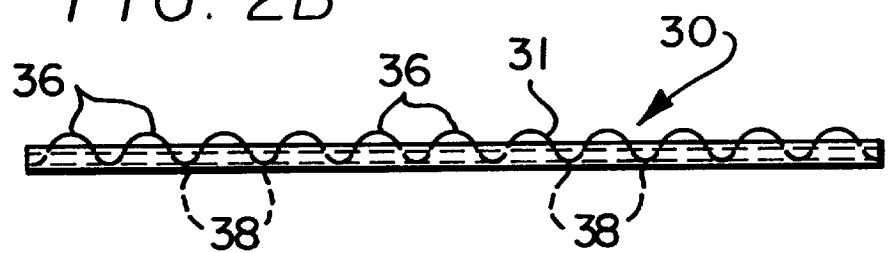
FIG. 2B is a side view of the screen of FIG. 2A.
Figure 49:
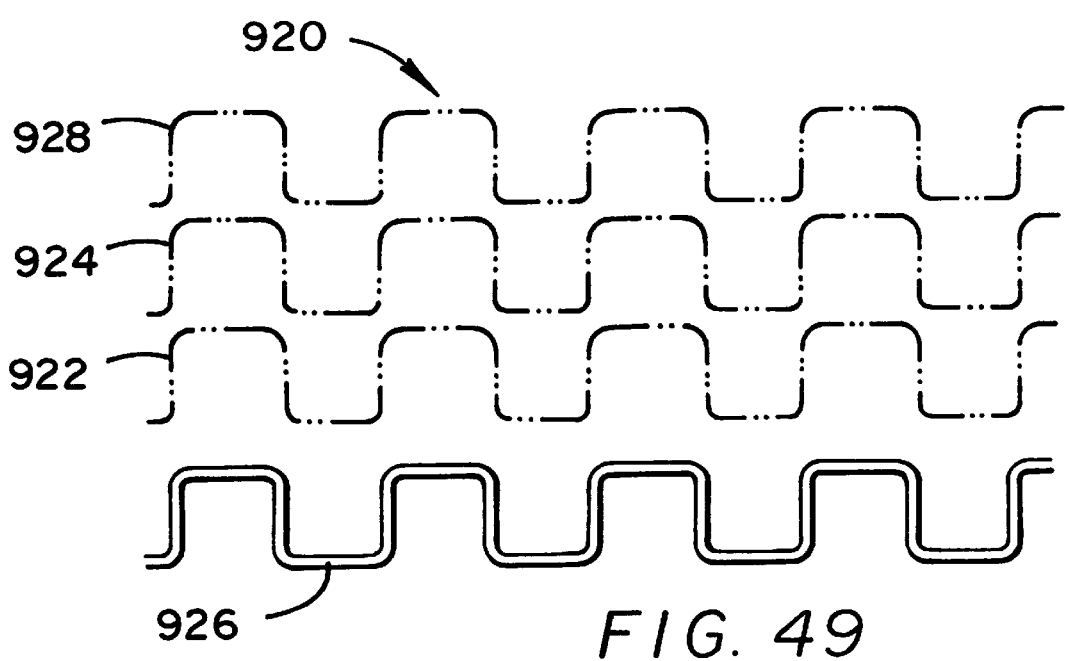

FIG. 49 shows a screen 920 like the screens 700 (FIGS. 39, 40) and 900 with a similar length and width (see FIG. 2), but with a somewhat different screen shape as viewed from the end. The screen 920 has a first layer of wire mesh 922, a second layer of wire mesh web 924 and a third layer of mesh or screening 928 (which are on the frame following final fabrication). A frame 926 (like the frame of the screen 900) supports the mesh and/or screening layers. In one aspect the layers shown for the screen rest one on top of the other and in another aspect one or more or all of the layers are bonded together and in another aspect they are bonded to the frame across their entire surfaces or only around the periphery thereof. The screens 900 and 920 may be used with or without straps (e.g. as the straps 714 and 716, FIG. 47). Individual cells of the screens 900 and 920 may be shaped as the individual cells of the screens of FIGS. 40 and 41 or they may be any desired shape, including but not limited to, oval, square, trapezoidal, or triangular (acute, obtuse, isosceles, congruent). The cells of the screens 900 and 920 are repairable as are cells of the previously-described screens.

Figure 50:
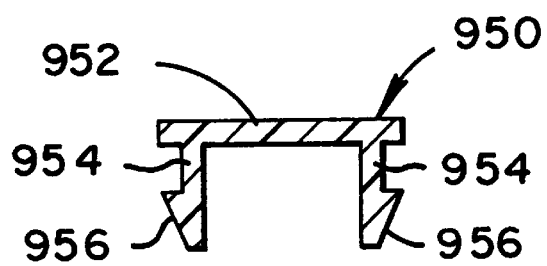
FIG. 50 is an end view of a plug according to this invention.

FIG. 50 shows a plug 950 for plugging off a cell of a screen according to the present invention. The plug 950 has a body member 952 and ears 956 which project from legs 954 depending from the body member 952. The plug 950 is made from a resilient material so the legs 954 are bendable to permit the ears 956 to enter a cell to be repaired and then expand outwardly so the ears catch and hold on an edge of the cell.

It is within the scope of this invention to have a plug held in a cell by friction fit, any "snap fit" structure, welding or adhesive. A plug according may be any desired shape to fit in and mate with the shape of a cell. The plug may be solid or it may be solid with openings, holes or perforations therethrough. In one aspect in which a cell is not initially behind a torn screen area a cell or cells is placed at the torn area on one side of the screen and a plug is inserted into the cell from the other side of the screen to repair a torn area.

FIG. 51A shows a screen frame 500 according to the present invention with a plurality of spaced-apart strips 502 (made of any suitable metal or metal-like material) secured to and between spaced-apart sides 504. Each end 506 of each strip 502 is received and held in a recess 524 in a side 504. The recess 524 corresponds in shape to the shape of the end 506 and a shoulder 526 of each strip 502 abuts a side 504. The end 506 may be inserted into the recess 524 from the side (to the left in FIG. 51B) or from above or below. The top and bottom strips 502 (as viewed in FIG. 51A) each has two humps or ridges 553 (see FIG. 51C) which are located, sized, and configured to be received in corresponding corrugations of a corrugated plate and/or corrugated screen assembly. it is within the scope of this invention for each strip to have one, two, or a plurality of multiple humps or ridges. In one aspect there is one hump or ridge for each corrugation on a superimposed plate and/or screen assembly.

FIG. 52 (prior art) shows a strip interlocking structure which includes a bulb 505 at each end of a strip 503 (disposed in a frame as are the strips 502). The bulb 505 is in a recess 525 in a side 501 (like the sides 504). The bulb 505 is lifted out from the recess 525 for removal or inserted into it from below or above for installation. A frame with such strips is prior art.

FIG. 53 (prior art) shows a strip interlocking structure which includes a bulb 509 at each end of a strip 508 (disposed in a frame as are the strips 502). The bulb 509 is in a recess 530 in a side 507 (like the sides 504). The bulb 509 is lifted out from the recess 530 for removal or inserted into it from below or above for installation. An enlarged end 531 resides removably in a recess 532 and prevents the strip 508 from inadvertently moving out from the recess 530 to the side (to the left in FIG. 53). A frame with such strips is prior art.

FIG. 54 shows a pattern of triangular openings for a perforated plate 510 (made of metal or metal-like material) (shown partially) according to the present invention usable with any embodiment disclosed herein of a perforated plate or that employs a perforated plate. The openings 511 are positioned side-by-side in an array that extends across substantially all of a plate. The plate may be corrugated or flat or a combination thereof with alternating flat and corrugated portions.

FIG. 55 shows a typical pattern of triangular openings for a perforated plate 510 according to the present invention usable with any embodiment disclosed here of a perforated plate or that employs a perforated plate. Openings 513 are positioned side-by-side in an array that extends across substantially all of a plate. Openings 514 and 515 are spaced apart from each other slightly more than the middle openings of the plate 510 producing, in certain embodiments, stronger central plate portions 550. The plate may be corrugated or flat or a combination thereof with alternating flat and corrugated portions.

In the pattern of openings as in FIG. 55, the pattern is shifted slightly as compared to that of the plate 510 to optimize use of a screening surface. For example, a screen using the pattern in FIG. 54 and a web width (distance between two adjacent openings) of 0.125", has a border of ¾" on each edge. By shifting the triangle openings to the pattern of FIG. 55, a web width of 0.125" may be maintained while decreasing the border. This allows more openings in the screen of FIG. 55 as compared to that of FIG. 54, increasing surface area and improving appearance.

In the pattern of FIG. 54, the openings are arranged in rows with bases and peaks alternating. The peak of one opening is even with the base of the next. In the pattern of FIG. 55 the openings 513 are moved closer together and the peaks of the openings 513 are not even with the base of the opening 514 or 515.

FIGS. 56 and 57 show a screen 530 according to the present invention with a corrugated support plate 540 (preferably made of metal) having a plurality of triangular openings 538 (not shown in FIG. 56; see FIG. 57) thereacross the surface of and therethrough; optional upturned edges 534 and 537 for anchoring the screen 530 to a vibratory shaker; wire mesh or meshes 539 secured to the plate 540; and plugs 536 at both ends (like previously described plugs) to plug ridge openings 532 at each end of the corrugations of the plate 540. The plate 540 rests on and is secured to a strip or strips 551 (alternately a frame of multiple strips criss-crossing the plate 540 or a series all in the same direction, or a perforated plate may be used). In one aspect the strip(s) 551 are deleted. The strips 551 may be made of any suitable material, including, but not limited to, metal, plastic, fiberglass, rubber, or cermet.

A screen according to the present invention (e.g. as those of FIGS. 51A–57) may be made without a plastic grid located between a lower plate and screen(s) or mesh(es) above the plastic grid. When screening material is bonded to a corrugated perforated plate (e.g. as in FIG. 57), thermal expansion puts the screening material in tension. Such a result is not produced when a plastic grid process is used. A metal corrugated perforated plate withstands tension induced thereon by screening material applied and/or bonded thereto. In one aspect the plate is first covered with adhesive (e.g. powdered epoxy) then the mesh(es) and/or screen(s) are palced on the plate. Upon curing of the epoxy, adhesive 541 covers or envelops part of the mesh/screen at the solid areas of the plate.

FIGS. 58–62 present a variety of configurations for corrugated perforated plates according to the present invention and/or for strips according to the present invention.

Figure 58:
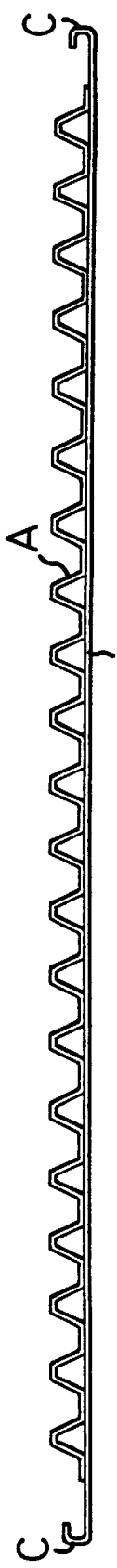
FIGS. 58–59, 60, 61, 62 present end views of corrugated perforated plates according to the present invention which structure may also be used for strips according to the present invention.

FIG. 58 shows a corrugated plate A on a support strip B having optional mounting hooks C.

Figure 59:
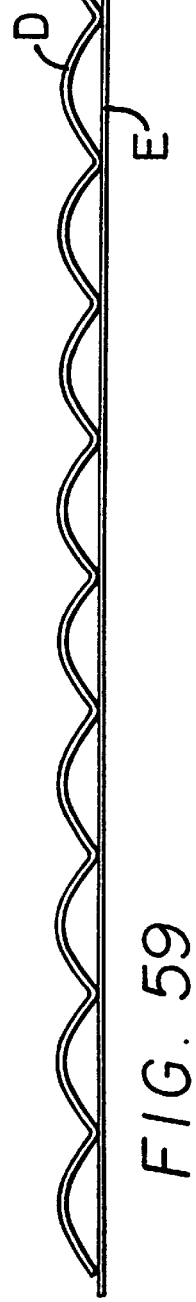

FIG. 59 shows a corrugated plate D on a support strip E. Optionally, mounting hooks may be used with such an assembly.

Figure 60:

FIG. 60 shows a support strip F. A corrugated perforated plate may have such a configuration and mounting hooks may be used with the strips or with the plate.

Figure 61:

FIG. 61 shows a support strip G. A corrugated perforated plate may have such a configuration and mounting hooks may be used with the strips or with the plate.

Figure 62:
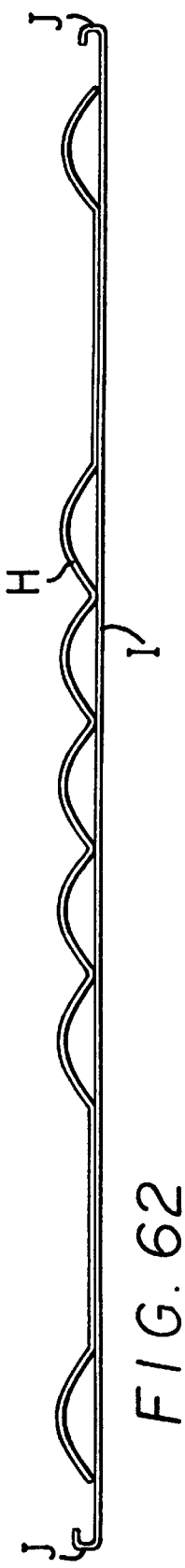

FIG. 62 shows a corrugated plate H on a support strip I having optional mounting hooks J.

Any mesh, meshes, screen, screens, screening material(s) or any combination thereof or any such as described herein may be used with any of the items shown in FIGS. 58–62.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A screen assembly for a vibratory separator, the screen assembly comprising a corrugated support plate having a plurality of alternating raised portions and lower portions, the corrugated support plate having a plurality of spaced apart openings therethrough, a plurality of spaced apart support strips extending beneath the corrugated support plate and to which the corrugated support plate is secured, and each support strip having a length and independent of and not connected to the other support strips along its length, each support strip having two spaced apart ends, screening material on the corrugated support plate.

2. The screen assembly of claim 1 further comprising a frame to which the corrugated support plate is secured and, wherein each support strip has two spaced apart ends each connected to a spaced apart side of the frame.

3. The screen assembly of claim 1 wherein the support strips are made of a material from the group consisting of metal, plastic, fiberglass, rubber or cermet.

4. The screen assembly of claim 1 wherein the spaced-apart openings of the corrugated support plate are triangular.

5. The screen assembly of claim 4 wherein the spaced-apart triangular openings are positioned side-by-side in an array that extends across substantially all of the corrugated support plate.

6. The screen assembly of claim 5 wherein the array comprises rows of triangular openings, each row including a repeating pattern of a first, second, and third triangular opening, the first and third triangular openings positioned with a main base down and a vertex pointing away from the base, the second triangular opening positioned between the first and third triangular openings with a primary vertex pointing toward a line connecting the bases of the first and third main triangular openings and positioned between sides of the first and third triangular openings, the second triangular opening with a primary base disposed beyond a line between the vertices of the first and third triangular openings that point away from their main bases.

7. The screen assembly of claim 6 wherein the first triangular openings of adjacent rows are positioned with their main bases in a side-to-side relationship, the third triangular openings of adjacent rows are positioned with their main bases in a side-to-side relationship, the second triangular openings of adjacent rows are positioned with their primary vertices pointing at each other.

8. The screen assembly of claim 1 wherein the corrugated support plate has two spaced-apart opposed sides, each of said sides having an upturned edge to facilitate anchoring the screen assembly to the vibratory separator.

9. The screen assembly of claim 1 further comprising the screening material comprising at least one wire mesh secured on the corrugated support plate.

10. The screen assembly of claim 9 wherein the at least one wire mesh is a plurality of wire meshes.

11. The screen assembly of claim 9 further comprising bonding material bonding the at least one wire mesh to the corrugated support plate.

12. The screen assembly of claim 11 wherein the bonding material is an adhesive and adhesive envelops solid areas of the corrugated support plate between the spaced-apart openings of the corrugated support plate.

13. The screen assembly of claim 9 wherein the corrugated support plate is made of metal and the at least one wire mesh is bonded directly to the corrugated support plate with no plastic grid therebetween.

14. The screen assembly of claim 12 wherein the adhesive is cured and the at least one wire mesh is in tension on the corrugated support plate due to thermal expansion effected during curing of the adhesive.

15. The screen assembly of claim 1 further comprising a plug in each opening beneath a raised portion.

16. The screen assembly of claim 1 wherein the at least one support strip has at least one projecting portion for reception within a raised portion of the corrugated support plate.

17. The screen assembly of claim 16 wherein the at least one support strip is a plurality of support strips and the at least one projecting portion is at least two projecting portions, each of the at least two projecting portions projecting into a raised portion of the corrugated support plate.

18. The screen assembly of claim 17 wherein for each raised portion of the corrugated support plate there is a corresponding projecting portion of each support strip.

19. A support plate for a screen assembly for a vibratory shaker, the support plate comprising a body with a plurality of spaced-apart triangular openings, the spaced-apart triangular openings positioned side-by-side in an array that extends across the support plate, and the array comprising rows of spaced-apart triangular openings, each row including a repeating pattern of a first, second, and third triangular opening, the first and third triangular openings positioned with a main base down and a vertex pointing away from the base, the second triangular opening positioned between the first and third triangular openings with a primary vertex pointing toward a line connecting the bases of the first and third main triangular openings and positioned between sides of the first and third triangular openings, the second triangular opening with a primary base disposed beyond a line between the vertices of the first and third triangular openings that point away from their main bases.

20. The support plate of claim 19 wherein the first triangular openings of adjacent rows are positioned with their main bases in a side-to-side relationship, the third triangular openings of adjacent rows are positioned with their main bases in a side-to-side relationship, and the second triangular openings of adjacent rows are positioned with their primary vertices pointing at each other.

* * * * *